Figure 1:
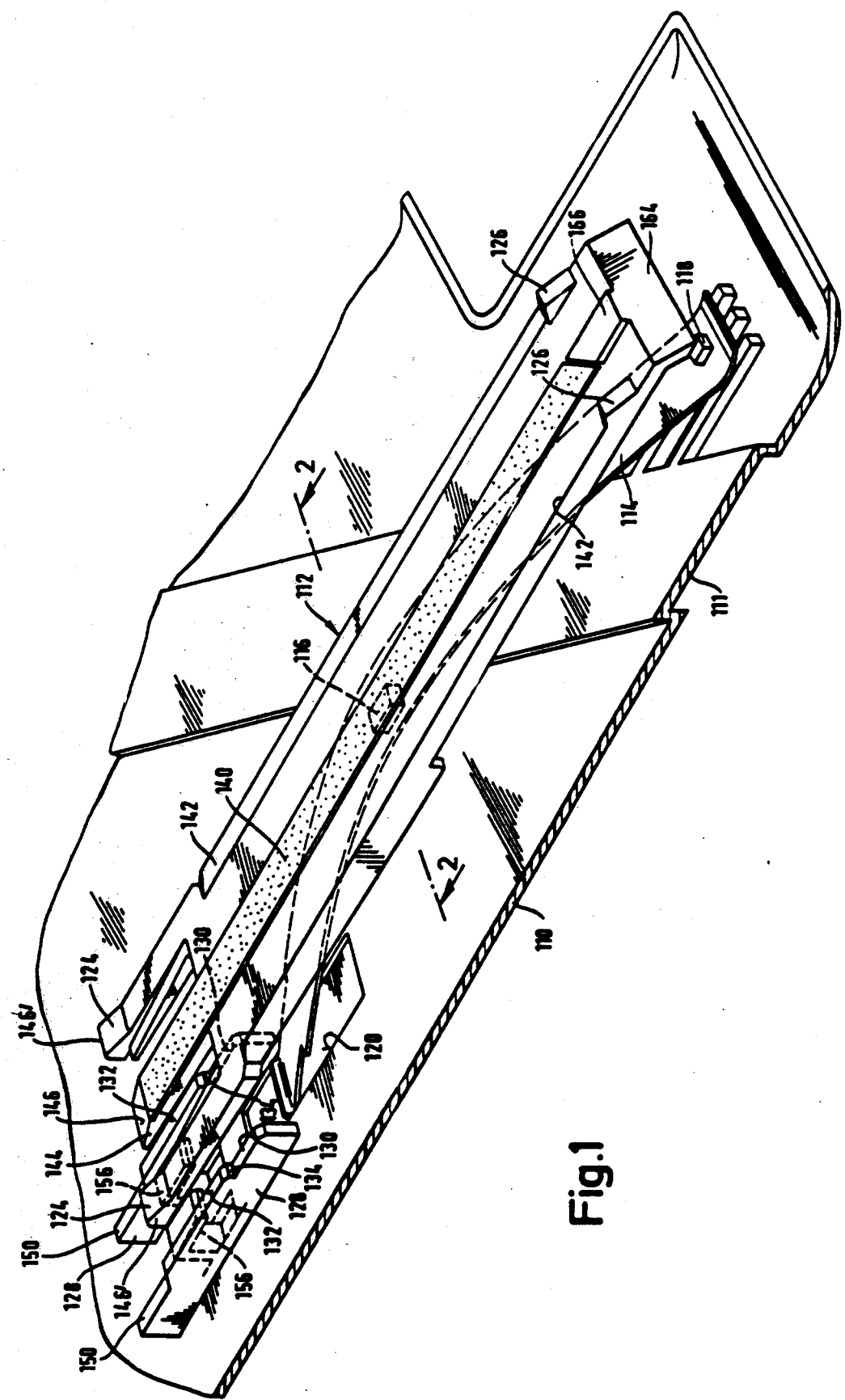

United States Patent [19]
Ackeret

[11] Patent Number: 5,193,795
[45] Date of Patent: Mar. 16, 1993

[54] DEVICE FOR THE CYCLIC REARRANGEMENT OF A PILE OF SHEETS

[75] Inventor: Peter Ackeret, Kusnacht, Switzerland

[73] Assignee: Licinvest AG, Landquart, Switzerland

[21] Appl. No.: 746,401

[22] Filed: Aug. 16, 1991

Related U.S. Application Data

[62] Division of Ser. No. 381,662, Aug. 14, 1989, Pat. No. 5,060,408.

[30] Foreign Application Priority Data

Nov. 21, 1987 [DE] Fed. Rep. of Germany ....... 3739500

[51] Int. Cl.$^5$ ............................................. G09F 11/30
[52] U.S. Cl. ...................................... 271/42; 40/513; 40/490; 40/511
[58] Field of Search .................. 271/131, 133, 42, 3.1, 271/128, 135, 137, 143; 40/508, 489, 490, 491, 509, 511, 513, 375, 380, 381

[56] References Cited

U.S. PATENT DOCUMENTS

| | | | |
|---|---|---|---|
| 3,783,540 | 1/1974 | Barclay | 40/78.07 |
| 4,245,417 | 1/1981 | Ackeret | 40/513 |
| 4,266,834 | 5/1981 | Ackeret | 312/8 |
| 4,376,348 | 3/1983 | Ackeret | 40/513 |
| 4,458,434 | 7/1984 | Ackeret | 40/513 |
| 4,759,142 | 7/1988 | Ackeret | 40/513 |

FOREIGN PATENT DOCUMENTS

| | | |
|---|---|---|
| 2403574 | 4/1979 | France . |
| 2454112 | 11/1980 | France . |
| 8603018 | 5/1986 | PCT Int'l Appl. . |
| 8603019 | 5/1986 | PCT Int'l Appl. . |
| 8603020 | 5/1986 | PCT Int'l Appl. . |
| 8603022 | 5/1986 | PCT Int'l Appl. . |
| 8603026 | 5/1986 | PCT Int'l Appl. . |
| 8603028 | 5/1986 | PCT Int'l Appl. . |
| 8603029 | 5/1986 | PCT Int'l Appl. . |
| 8603030 | 5/1986 | PCT Int'l Appl. . |

Primary Examiner—David H. Bollinger
Attorney, Agent, or Firm—Jeffrey H. Ingerman

[57] ABSTRACT

A device for the cyclic rearrangement of a pile of sheets with a housing having a viewing window, from which housing a slider member can be withdrawn and reinserted, and with elements for removing a sheet from an inserted pile and transferring the same to the other end of the pile on each movement cycle of the slider member. When the slider member is inserted the pile is pressed against the viewing window by a pressing arrangement which comprises rails supported on leaf springs. The rails having integrally moulded function elements, such as anchoring projections, sheet stop members, blocking projections, spacer ribs and guide prongs.

6 Claims, 33 Drawing Sheets

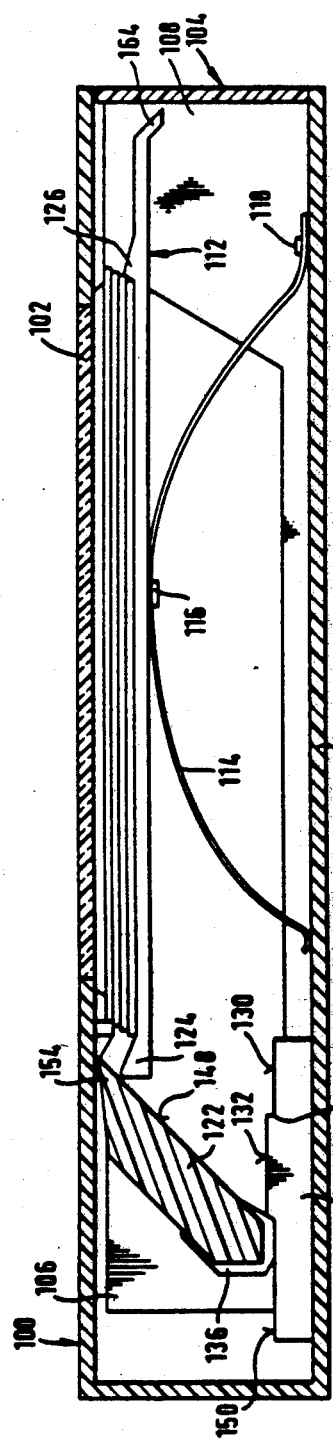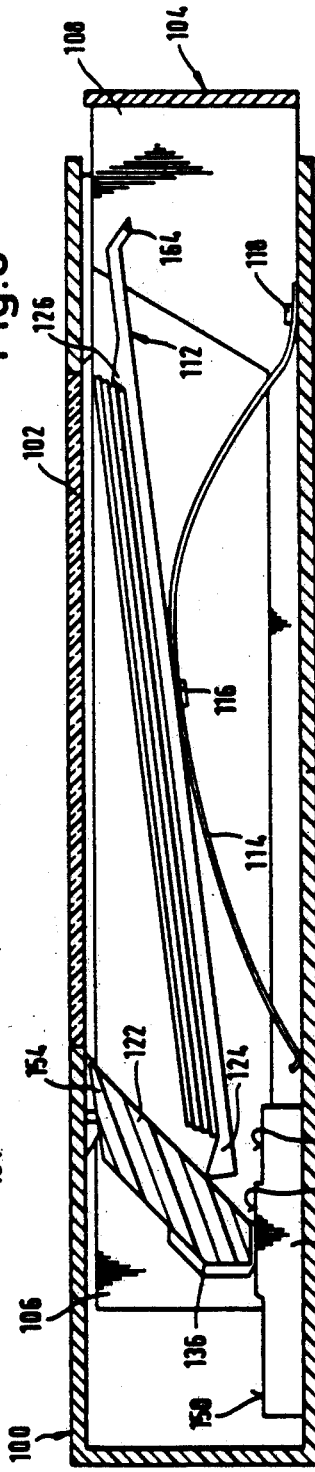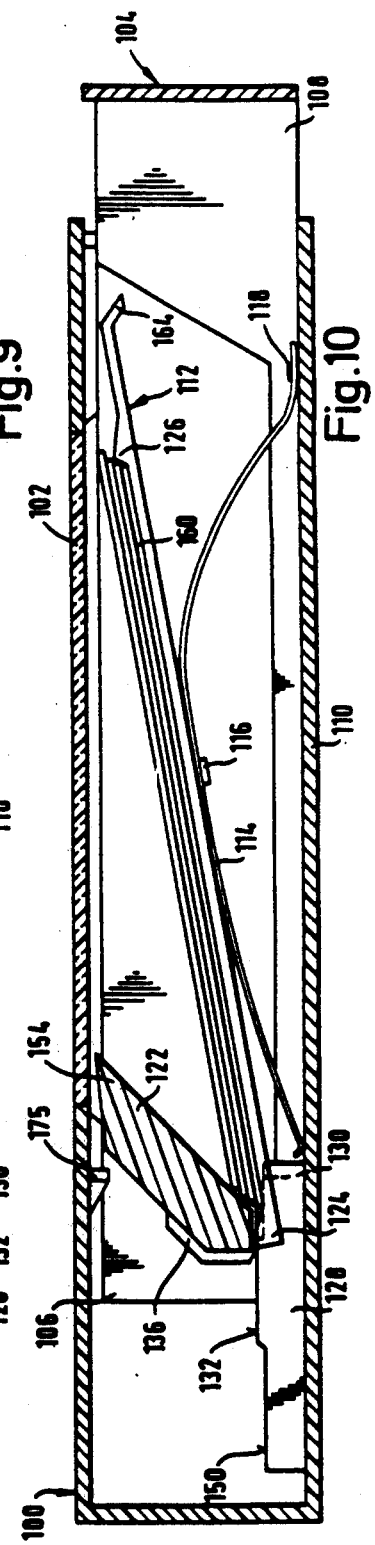

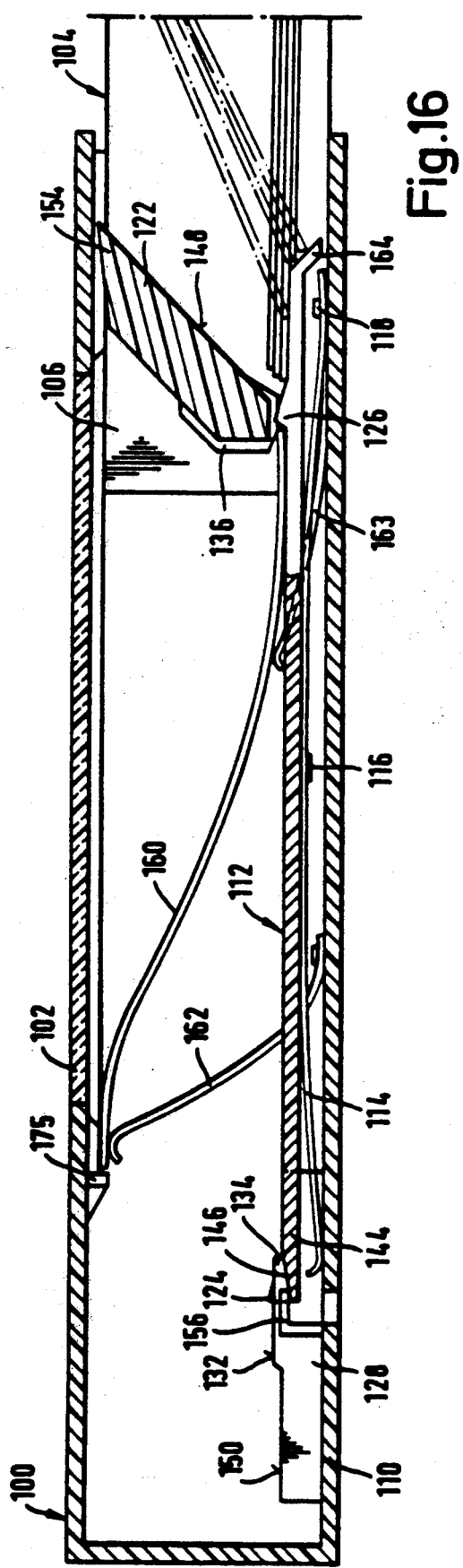
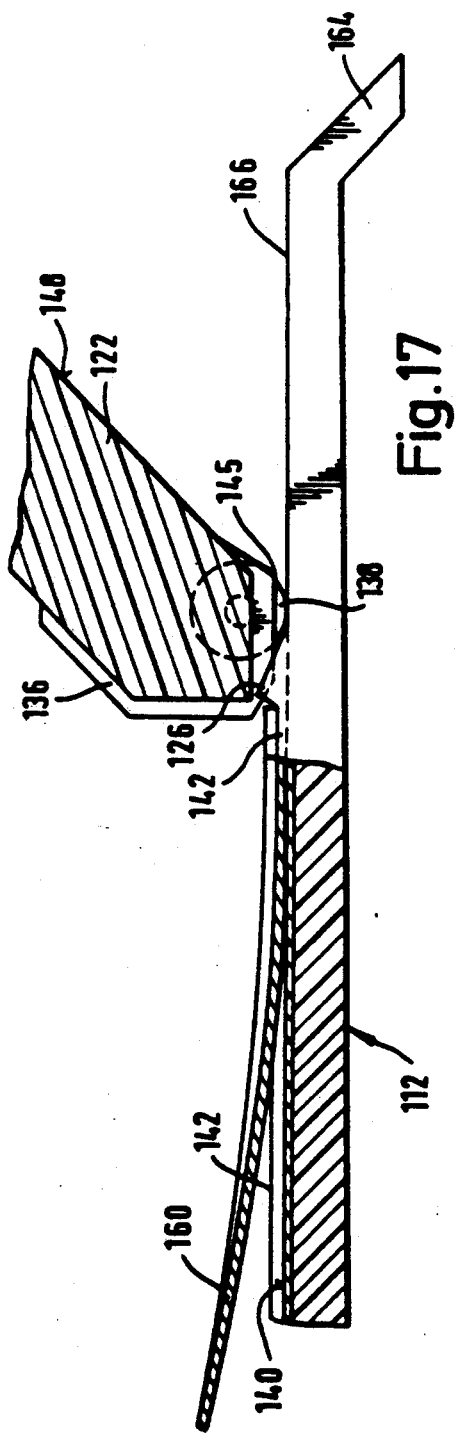

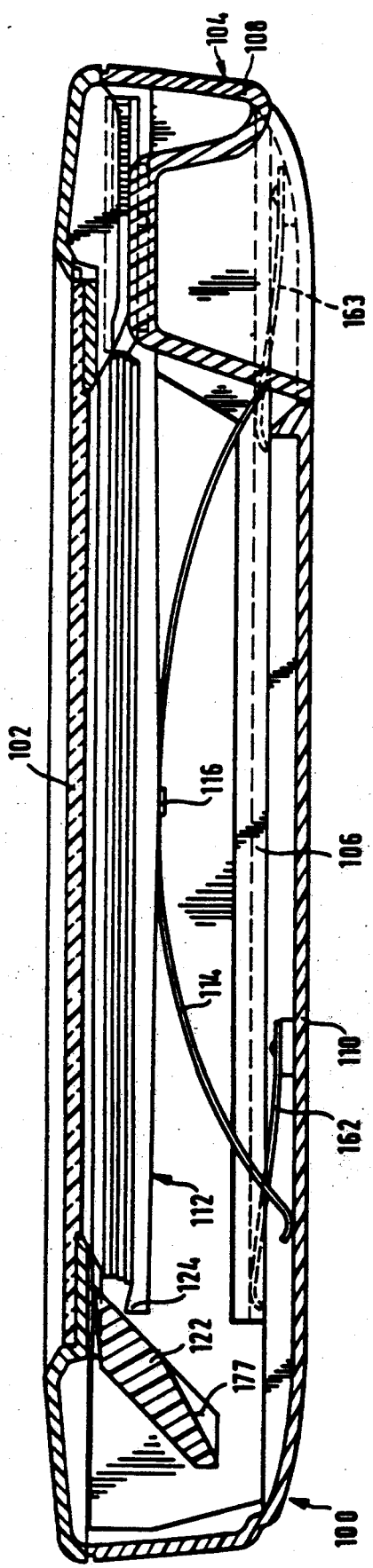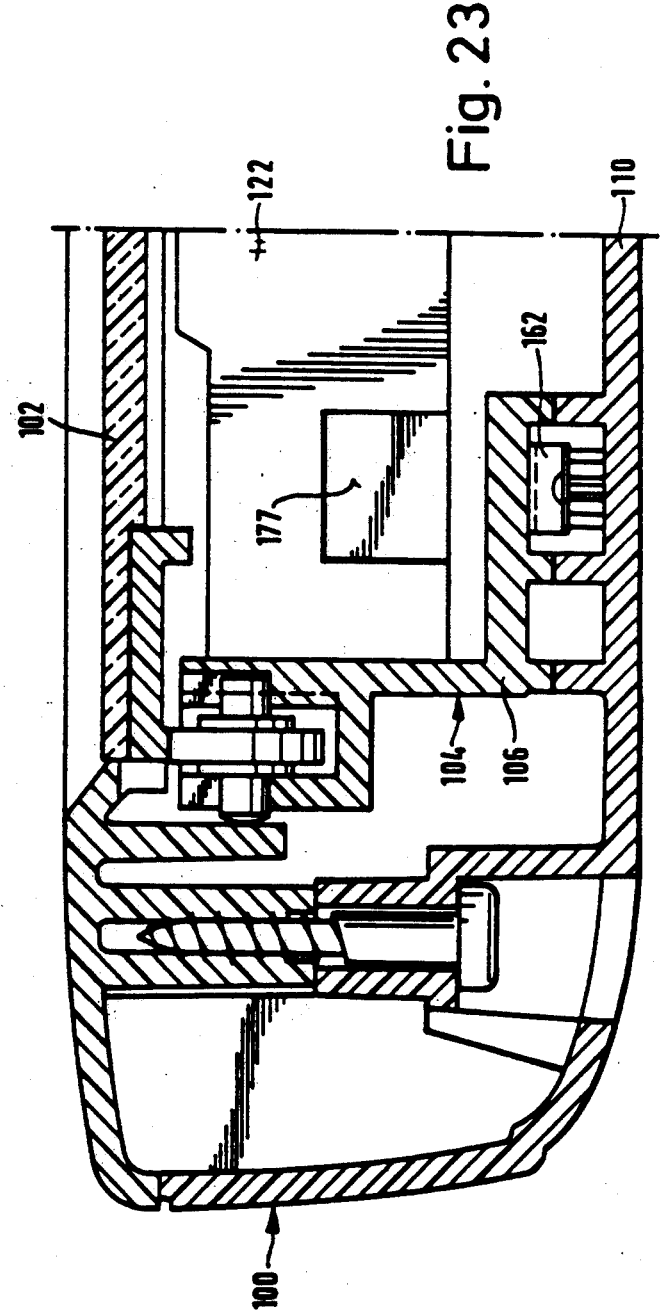
Fig. 22
Fig. 23

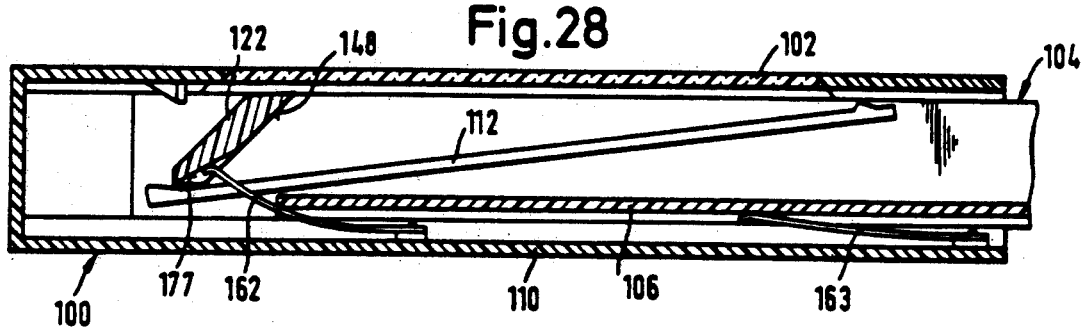
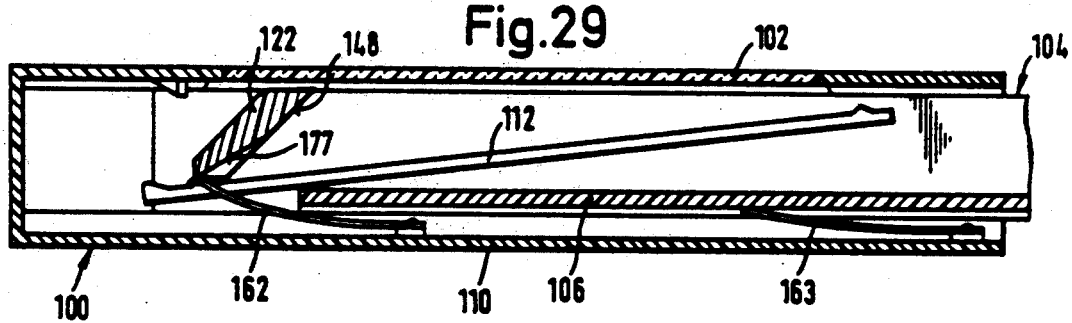

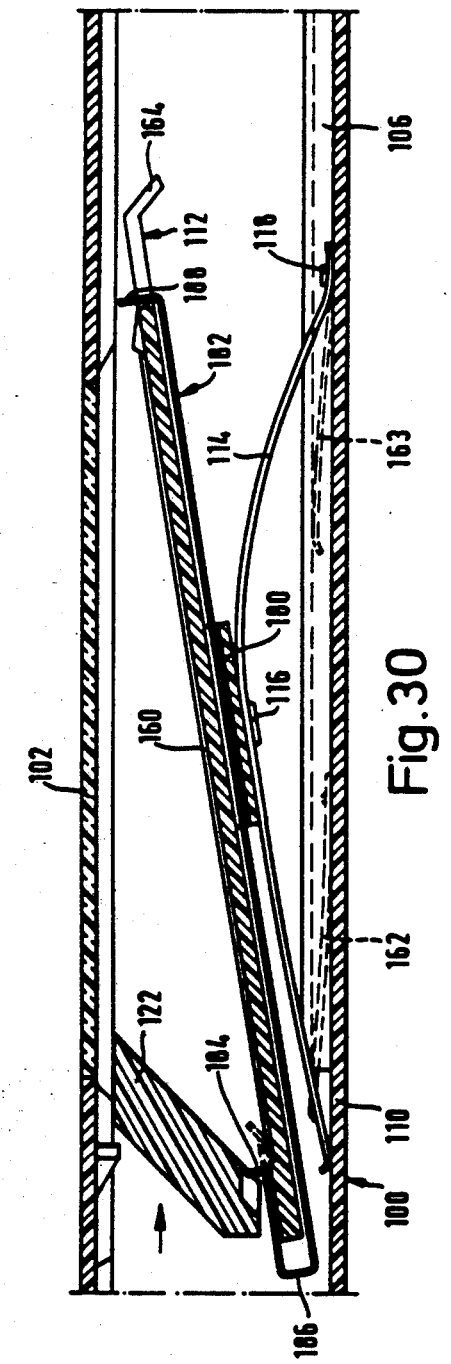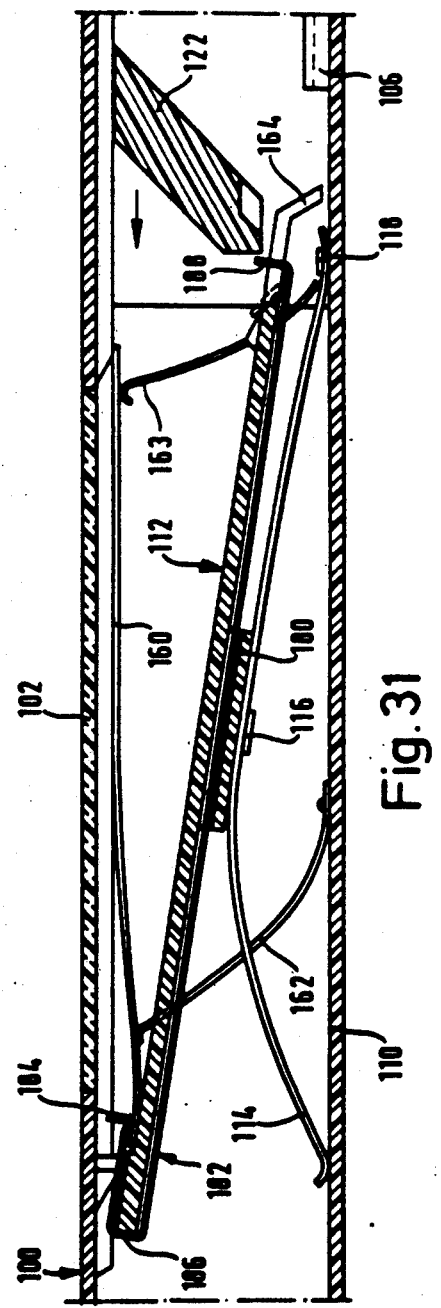

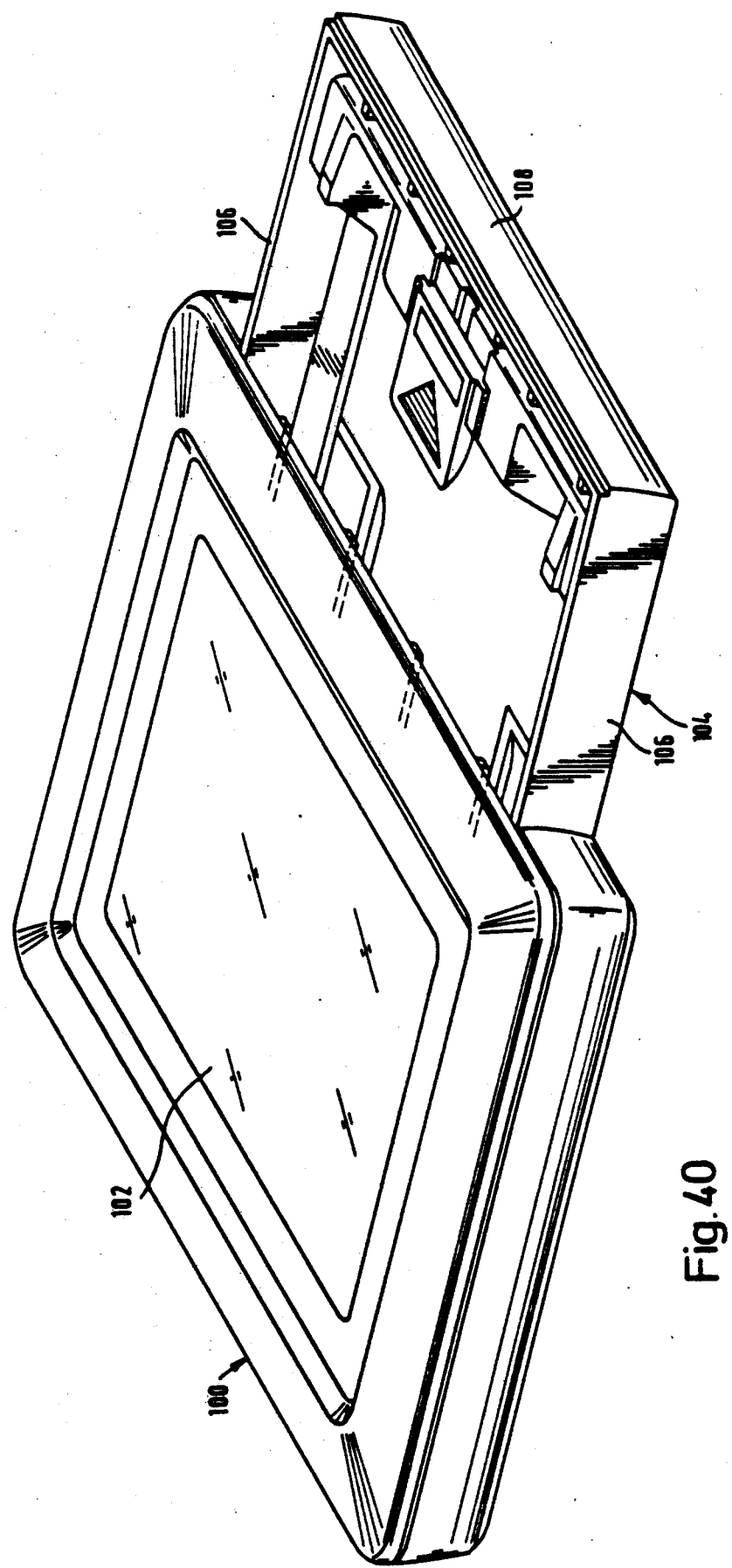

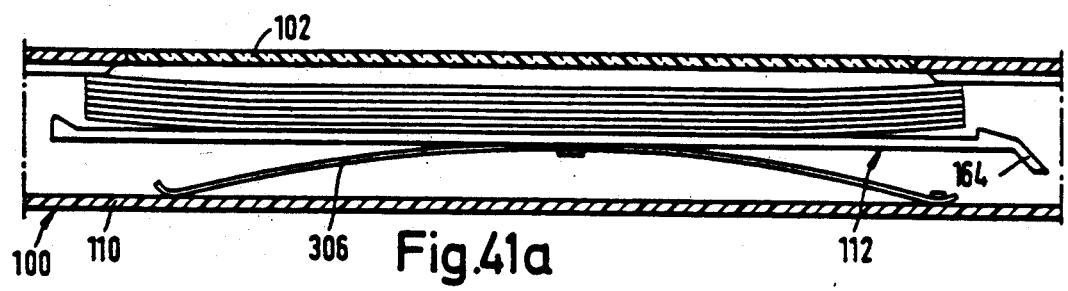
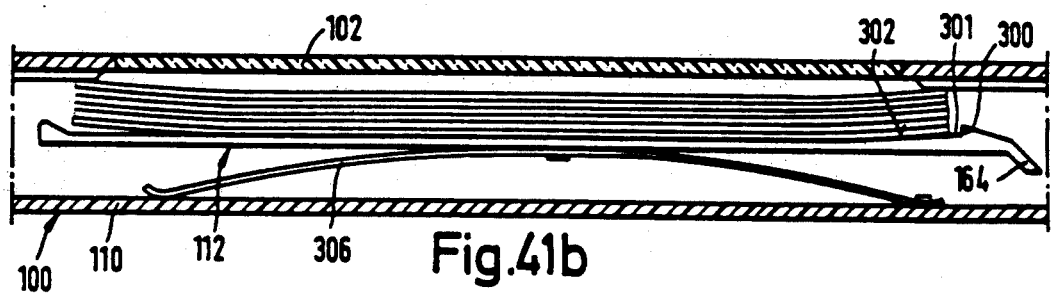
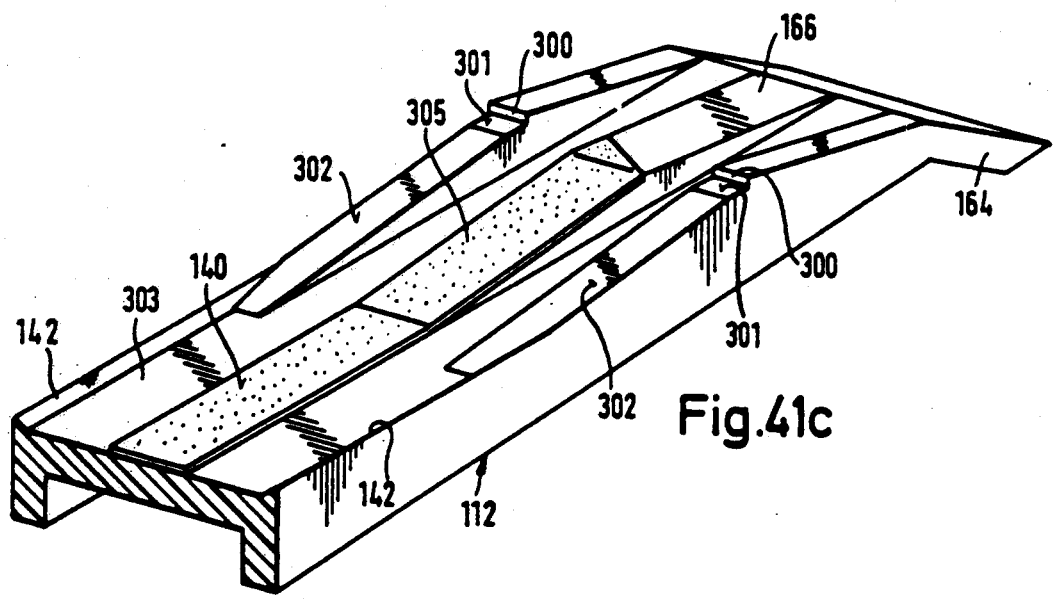
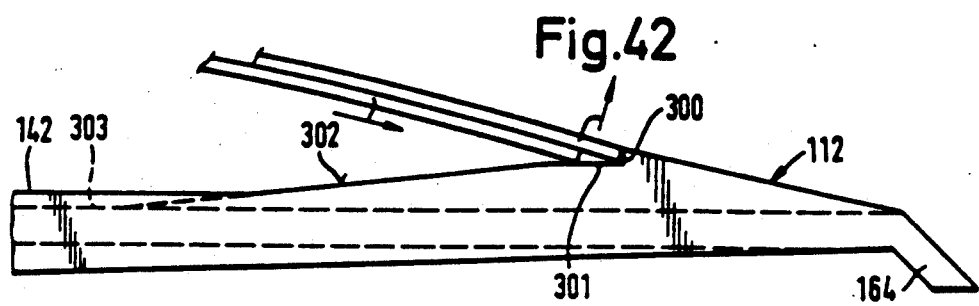

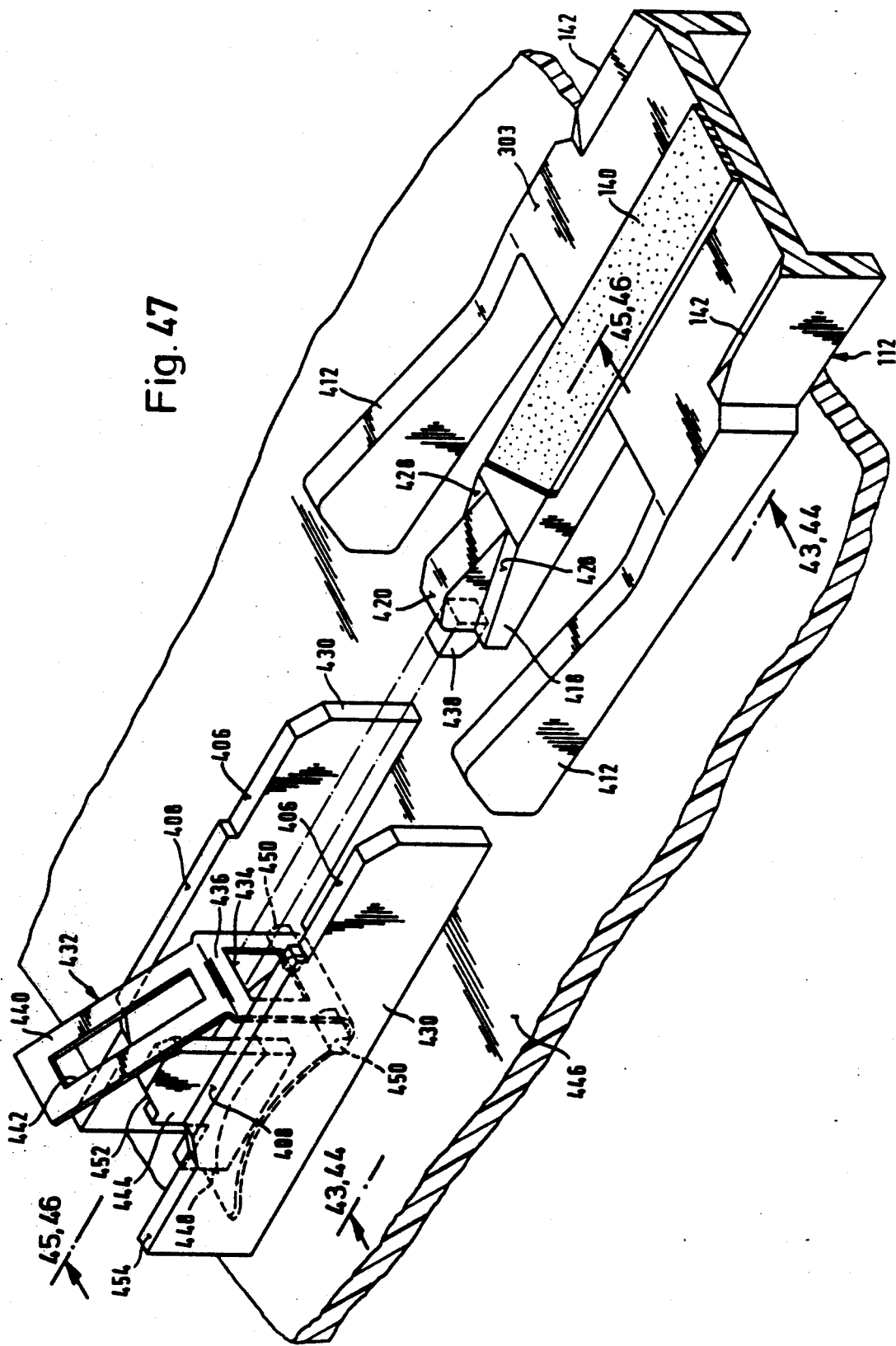

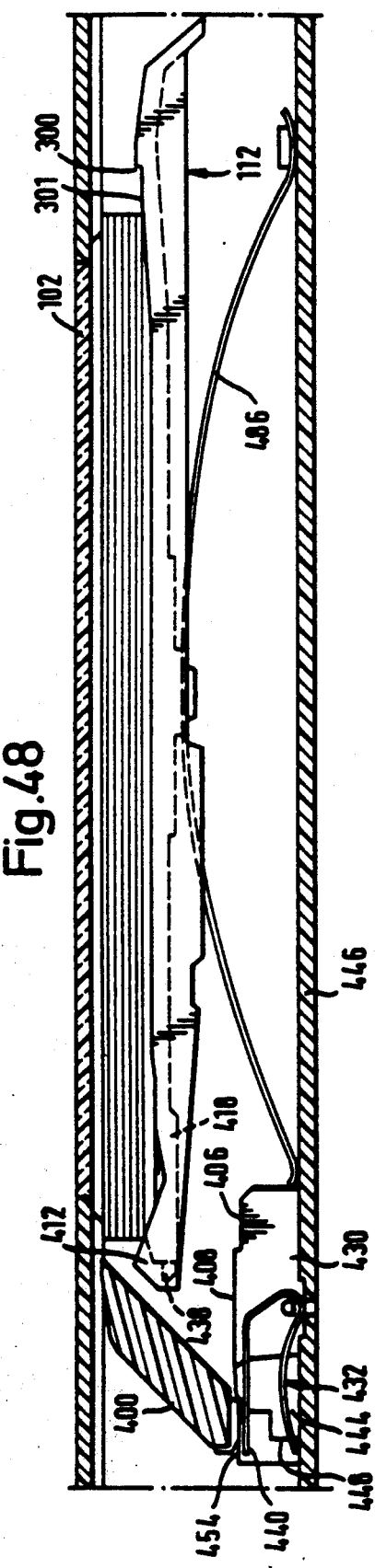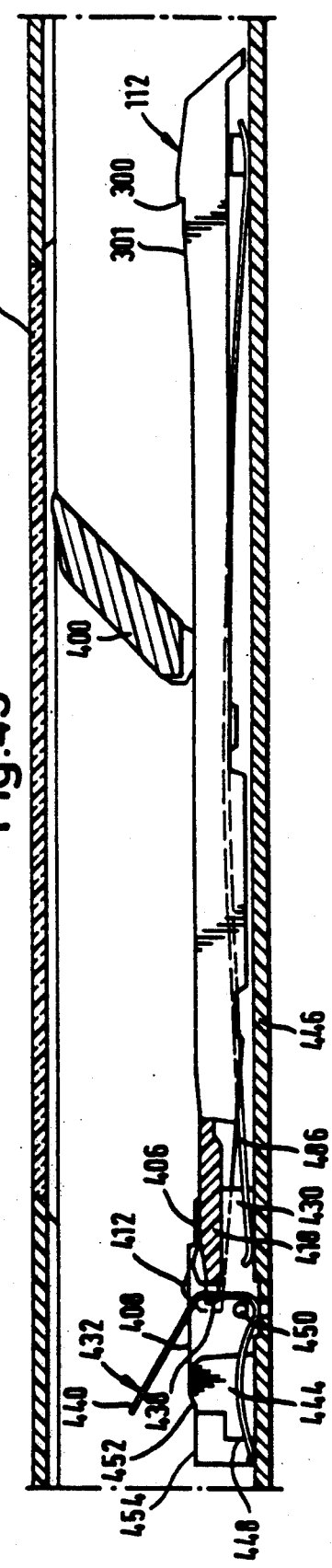

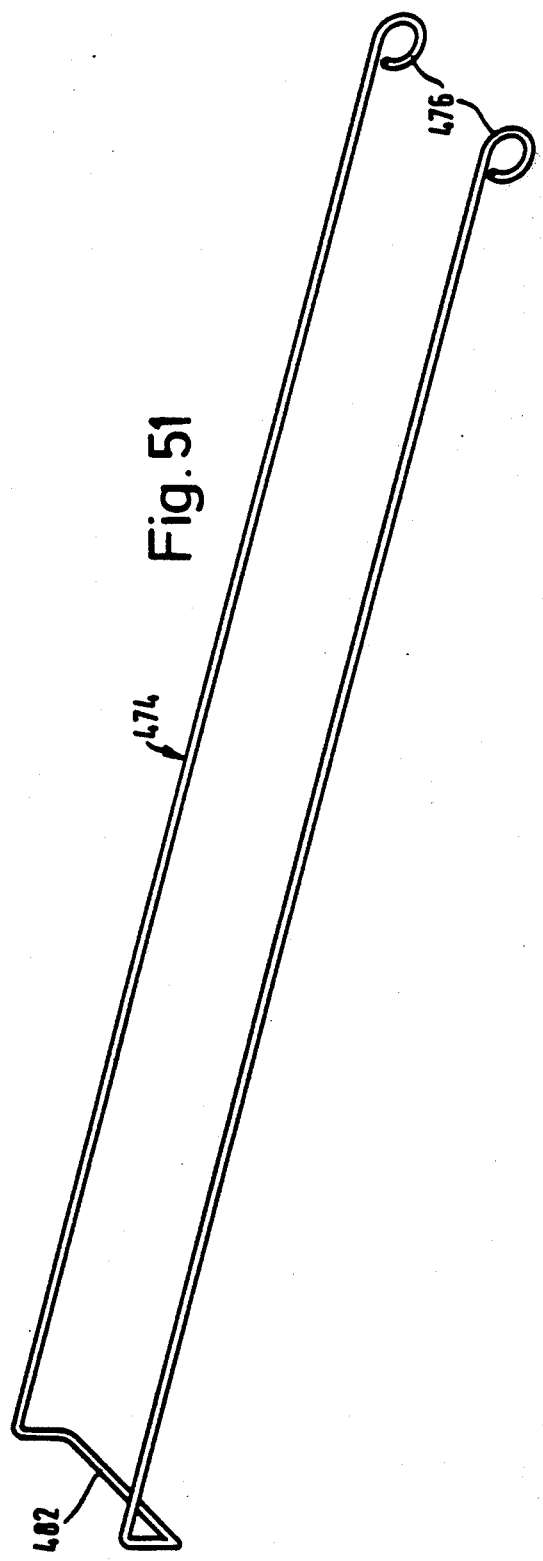
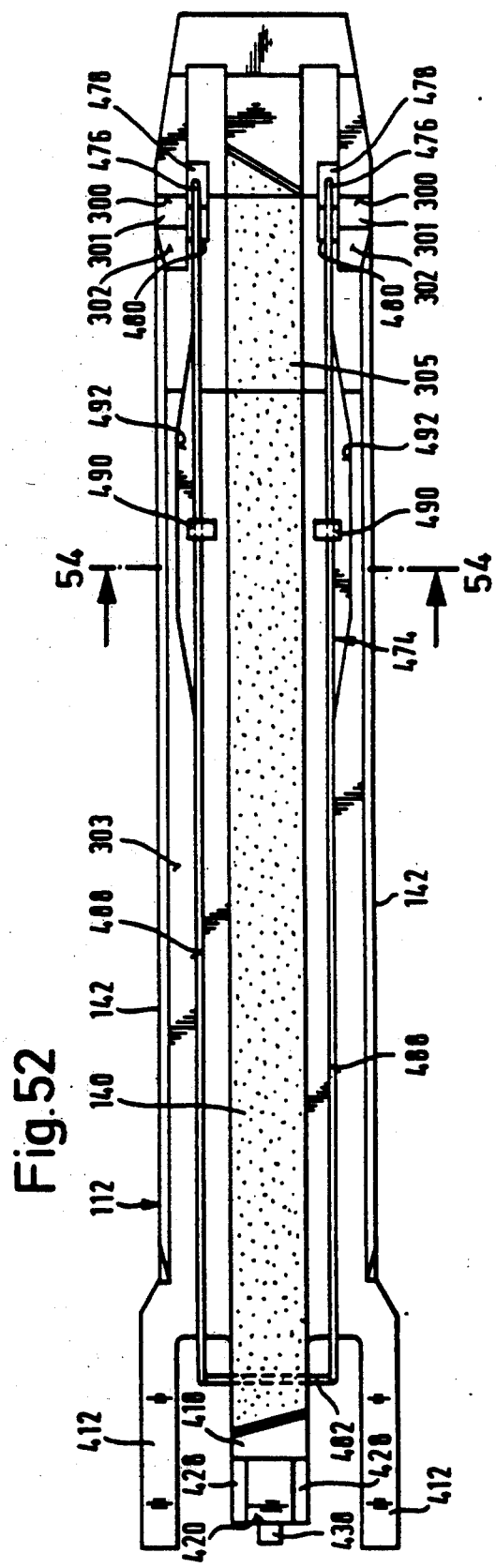

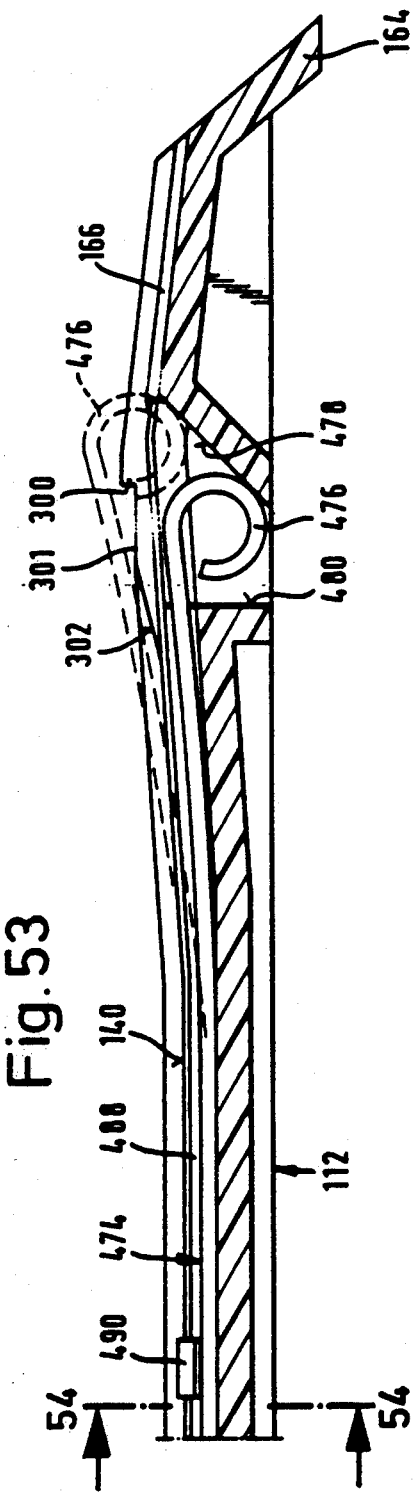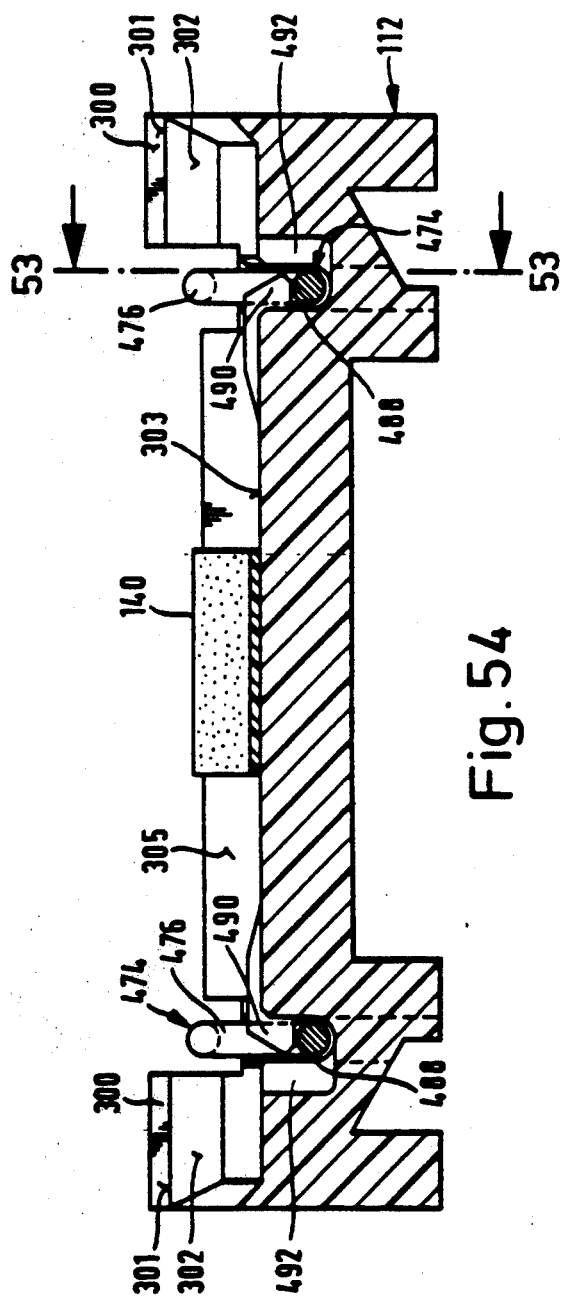

DEVICE FOR THE CYCLIC REARRANGEMENT OF A PILE OF SHEETS

CROSS REFERENCE TO RELATED APPLICATION

This application is a division of copending, commonly assigned U.S. patent application Ser. No. 07/381,662, filed Aug. 14, 1989, now U.S. Pat. No. 5,060,408.

The invention relates to a device for the cyclic rearrangement of a pile of substantially rectangular sheets of nominally identical thickness.

Such a device, which here and hereinafter shall be referred to as a "sheet-changer" for short, is described and illustrated in publications WO 86/03019, WO 86/03018, WO 86/03022, WP 86/03026, WO 86/03028, WO 86/03029, WO 86/03030, which are hereby incorporated by reference in their entirety.

The known device comprises a housing provided with a viewing window and forming the first frame part, and a slider member forming the second frame part. The separating elements are formed on the one hand by a step which is arranged fixedly in the housing, and on the other hand by an inner transverse member of the slider member called the separator. The feeding means comprises free ends of hook-like construction of springs mounted in the housing, which engage the edges of the sheet lying furthest away from the step. The individual sheet is held in the housing in that in the housing there are fixedly arranged retentive coatings extending in the direction of movement of the slider member, against which retentive coatings the individual sheet is pressed by small rollers mounted on the separator. The separator also serves as a retaining means for holding the remainder of the pile in the slider member. The guide means comprises the free ends of spring arms mounted in the housing that lift the individual sheet away from the retentive coatings when the slider member is pulled and guide it in front of a return slot defined by the separator. The pressing device too is formed by the free ends of spring arms mounted in the housing, namely by a pair of springs of the feeding means and a pair of spring arms forming the guide means. The spring arms are respectively controlled, released and depressed by these springs for given portions of the relative movement of the slider member.

With the slider member inserted, the pile rests on ledges of the slider member parallel with the viewing window, the ledges defining a level which is closer to the viewing window than that of the retentive coatings so that the pile is spaced from the retentive coatings on reinsertion of the slider member. Furthermore, the separator is designed such that, as the slider member is withdrawn, it is not possible for one or more sheets to be separated from the remainder of the pile in addition to the separated individual sheet. Reference should be made to the content of the said publications for further details.

The known picture changer gives no cause for complaint as regards its function. However, it is in need of improvement in two areas:

Firstly, a large number of functional elements are provided, which have to be manufactured separately and the correct co-operation of which cannot be determined until they are assembled. Secondly, the control of the spring functions by the slider member causes variable friction conditions over the withdrawal path, which the user is able to feel clearly.

It is the aim of the invention to develop a sheet changer whose manufacture is simplified and at the same time the relative movement of the frame parts can take place with essentially the same or at least very gradually variable and minimal friction over the withdrawal path.

This problem is solved by the invention described below

This concept offers a whole series of advantages: Whereas in the known sheet changer the control of the spring functions is effected by the slider member running onto these springs, in the construction according to the invention the rail elements can be anchored by or released at one end at fixed housing parts. The rail elements may furthermore have integrally moulded elements which co-operate with the separator to prevent the separation of a second sheet from the remainder of the pile. Projections, which serve as feeding means, may also be integrally moulded with the rails. The retentive coatings can be arranged on the rails, as can the means for holding the remainder of the pile away from the retentive coatings as the slider member is reinserted. Other functional elements can be provided on the rails, for example the blocking elements which prevent the sheets getting beneath the pressing system as a pile of sheets in placed in the sheet changer. The rails may also be provided with a different controllable transporter for the individual sheet.

Further features and advantages of the invention will become apparent from the subsidiary claims and from the description of exemplary embodiments.

Exemplary embodiments of the invention are explained in detail below with reference to the accompanying drawings.

Figure 2:
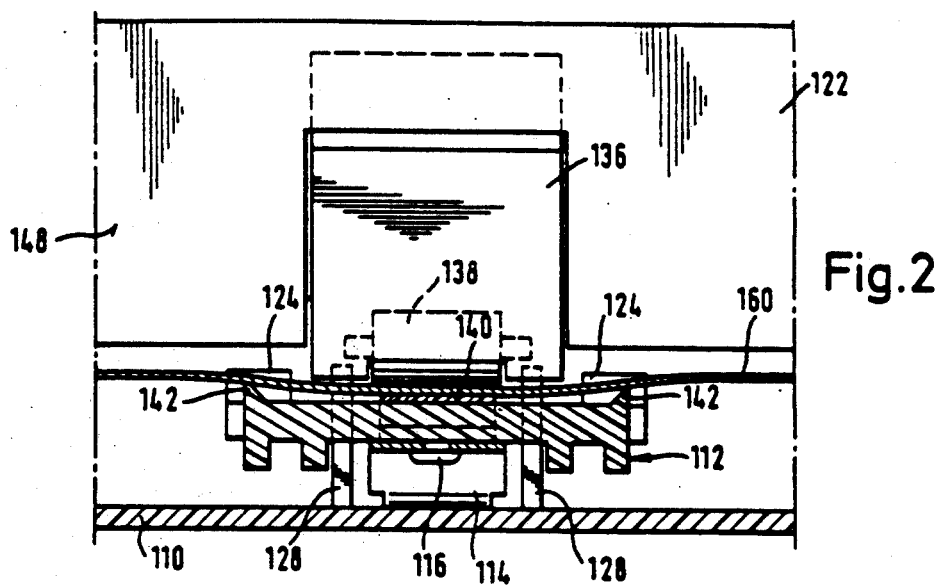
Figure 5:
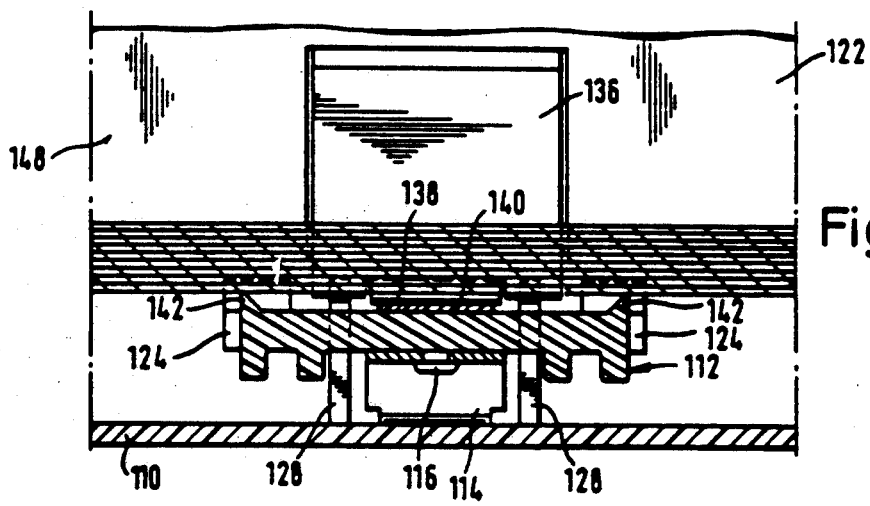
Figure 6:
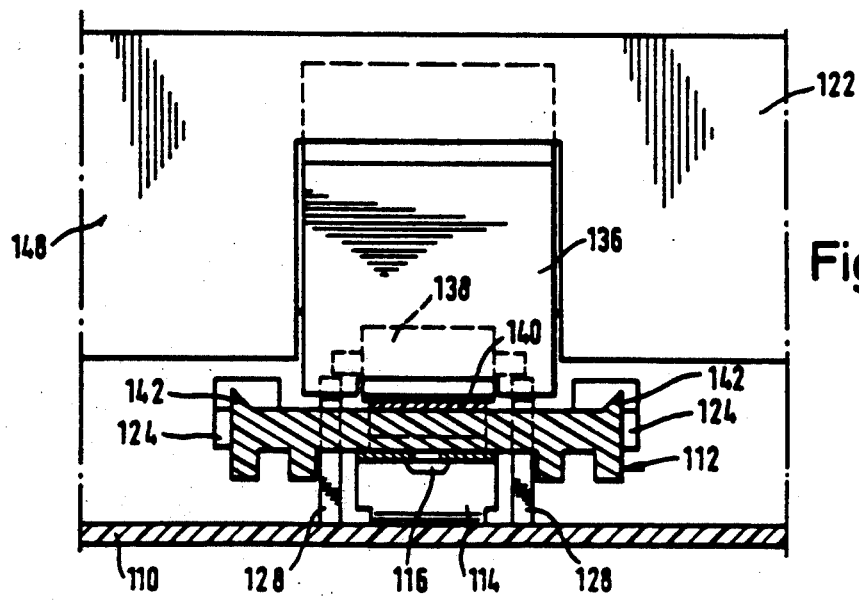
Figure 3A:
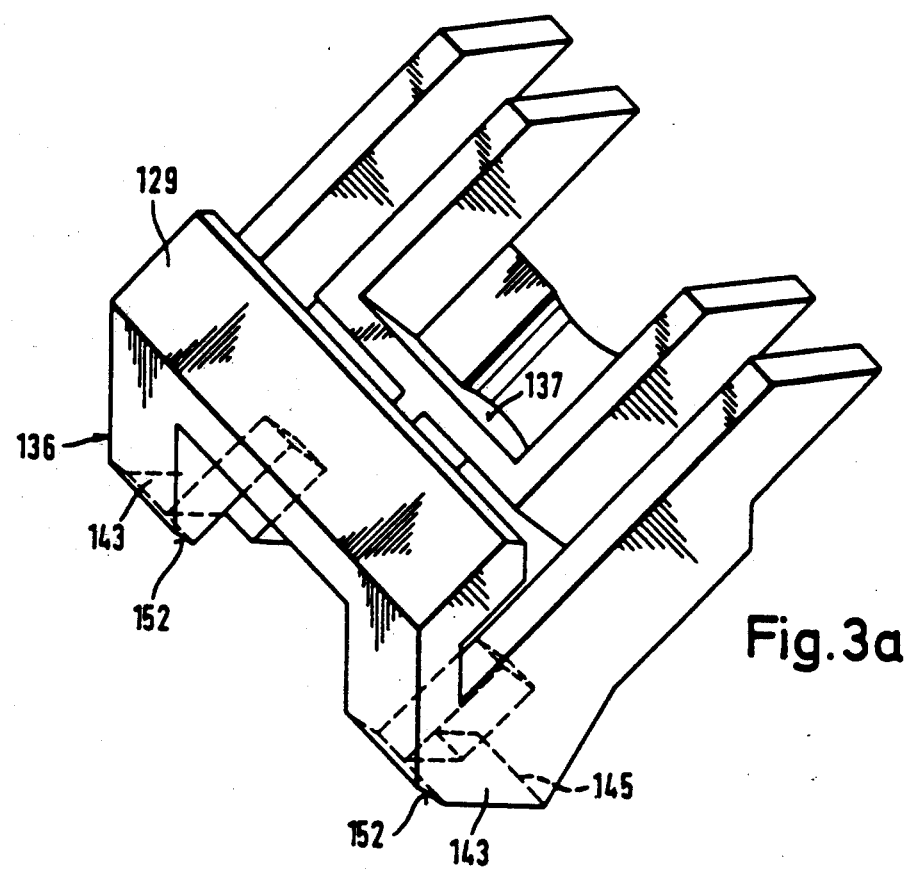
Figure 3:
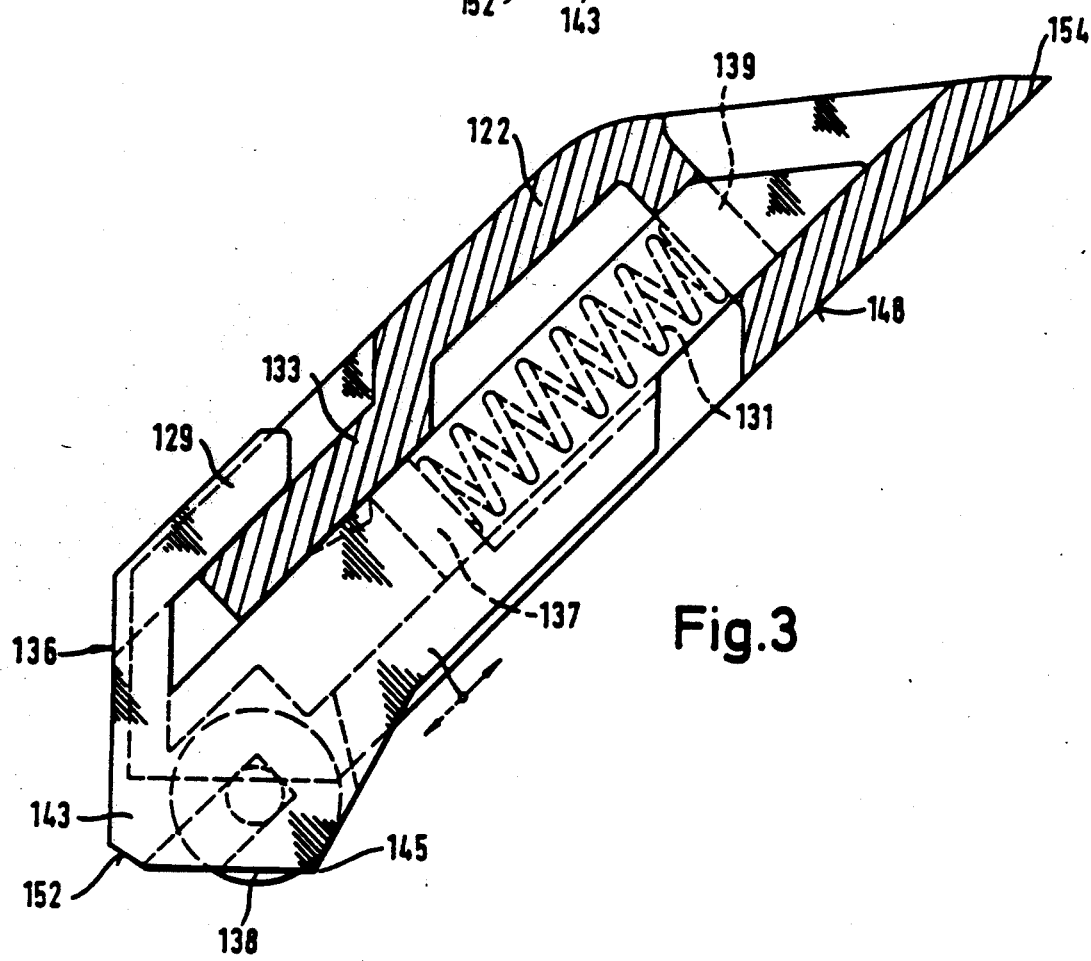
Figure 4:
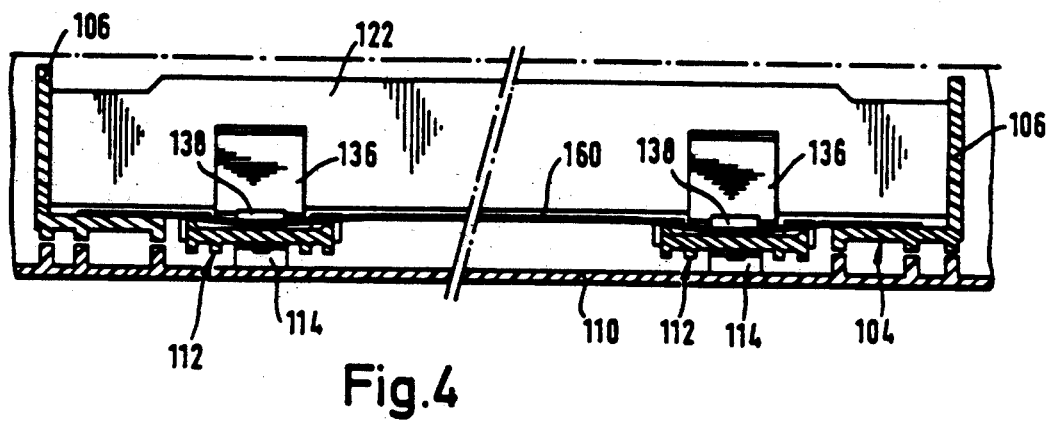
Figure 7:
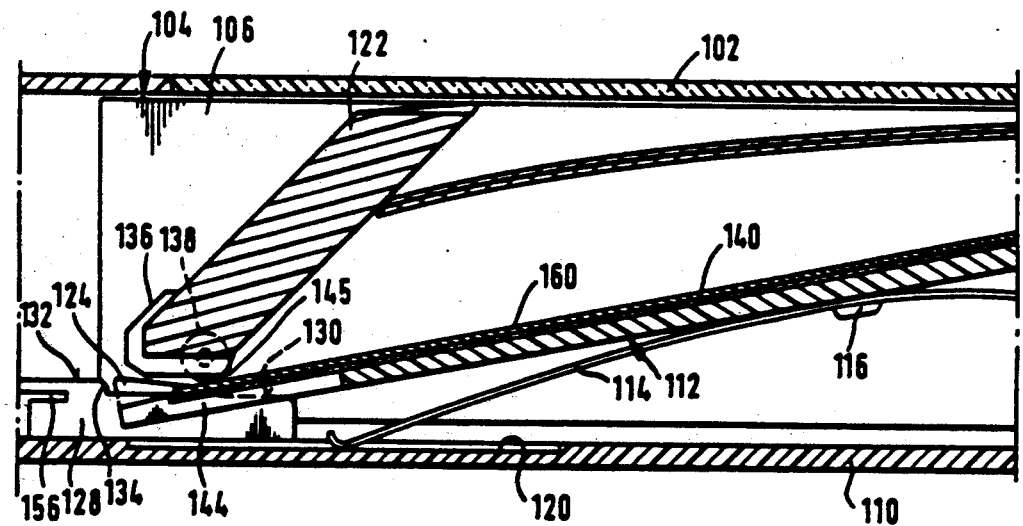
Figure 11:
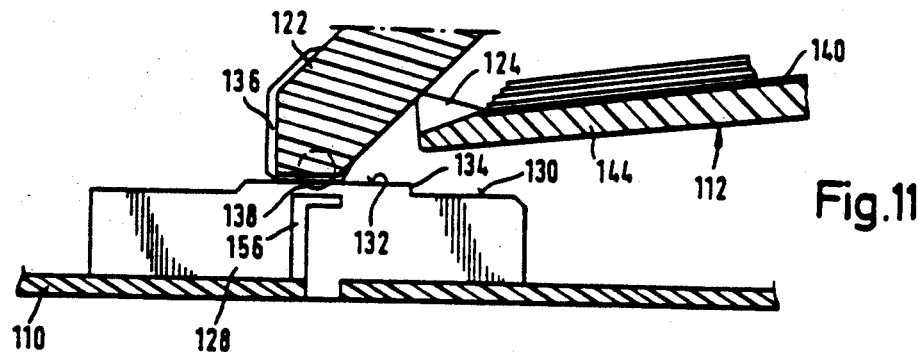
Figure 12:
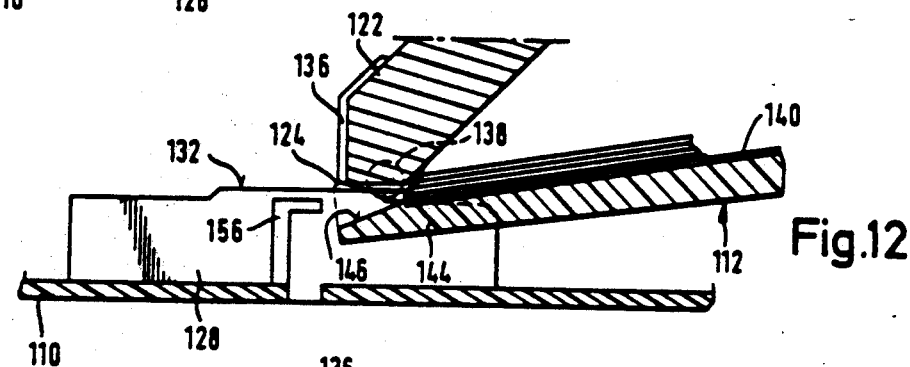
Figure 13:
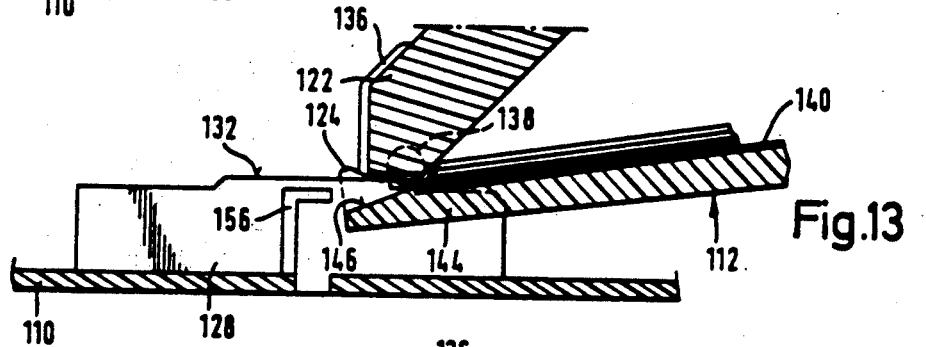
Figure 14:
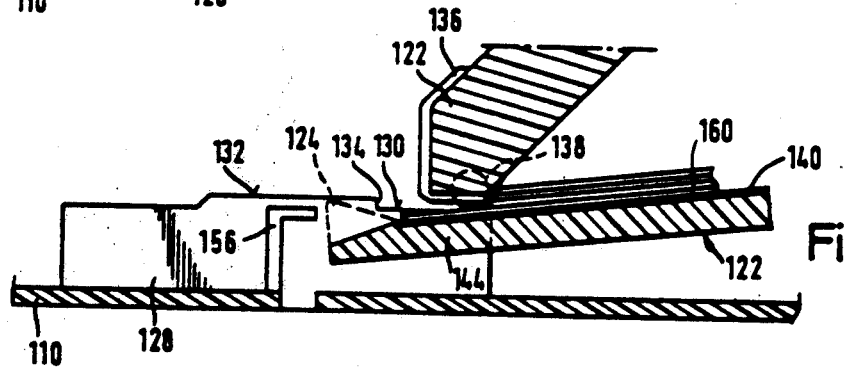
Figure 15:
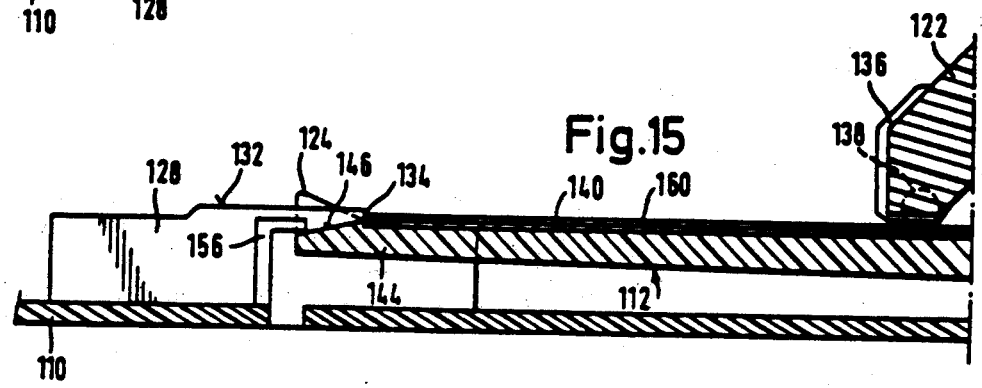
Figure 18:
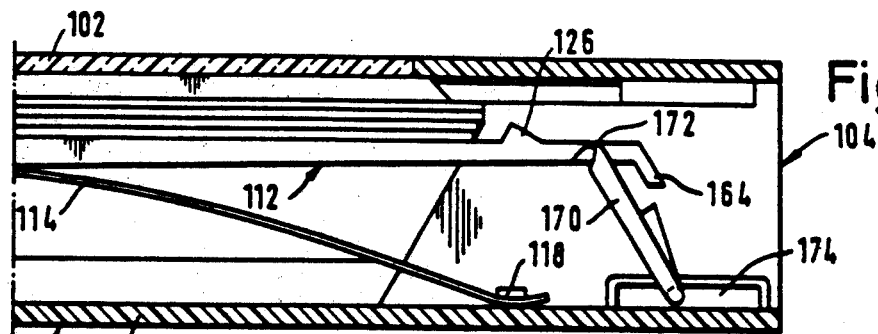
Figure 19:
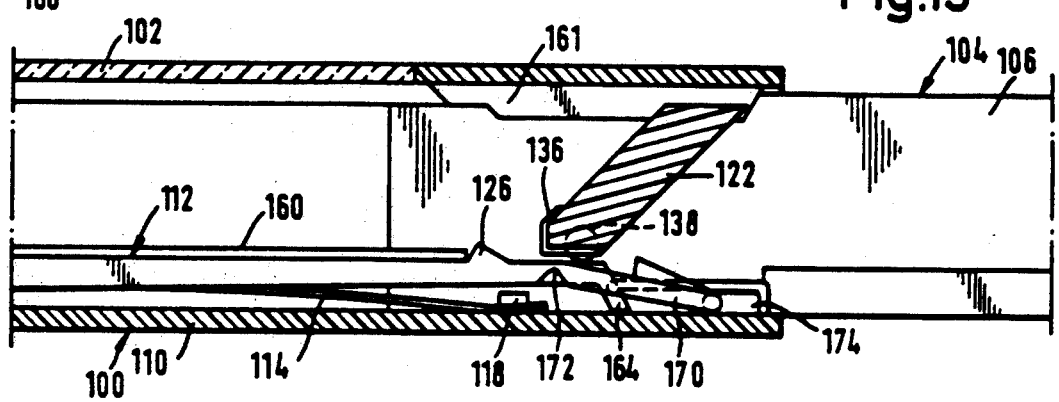
Figure 20:
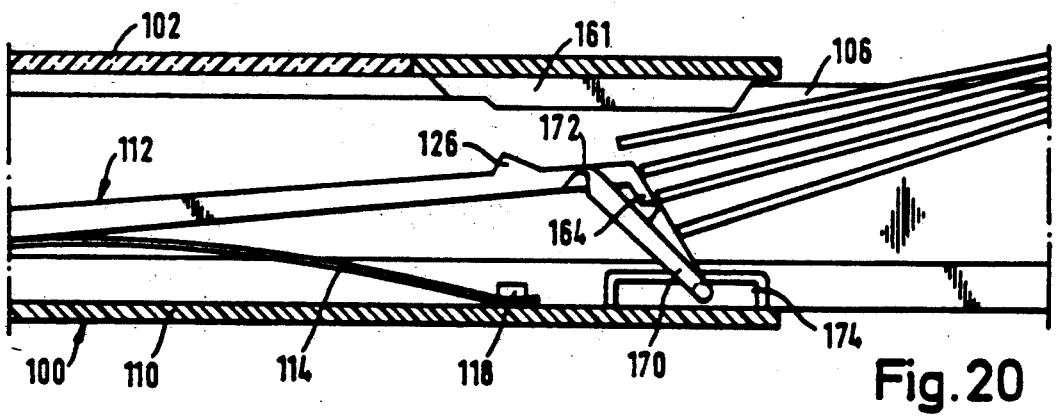
Figure 21:
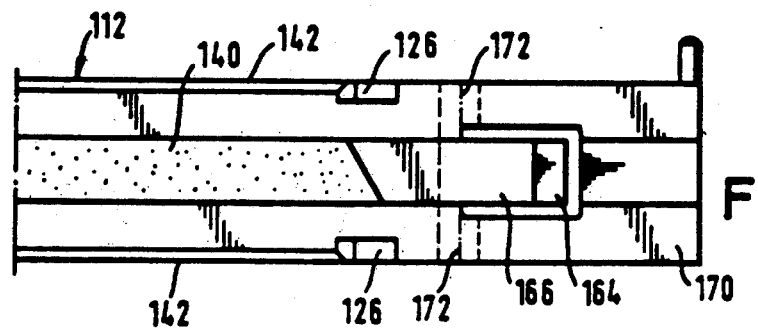
Figure 24:
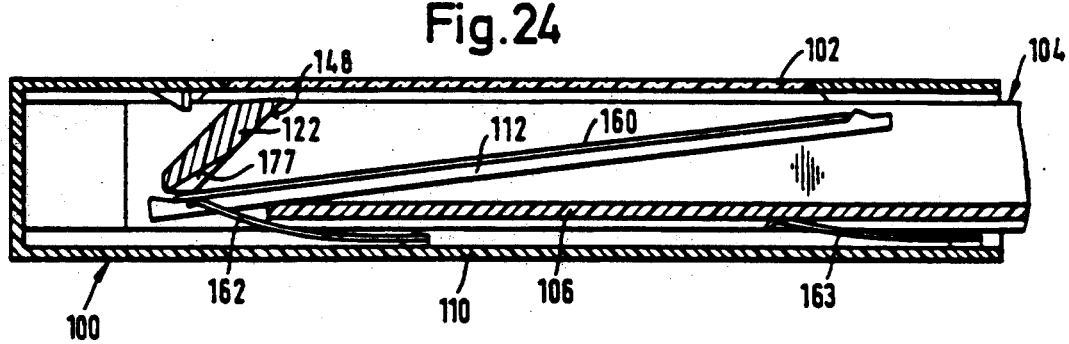
Figure 25:
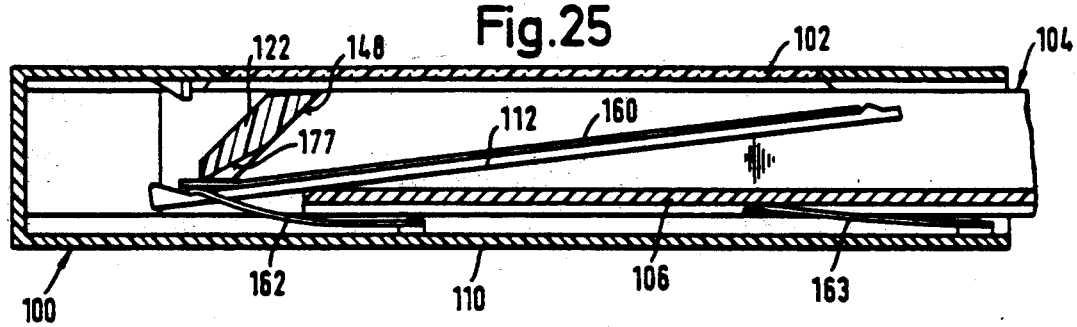
Figure 26:
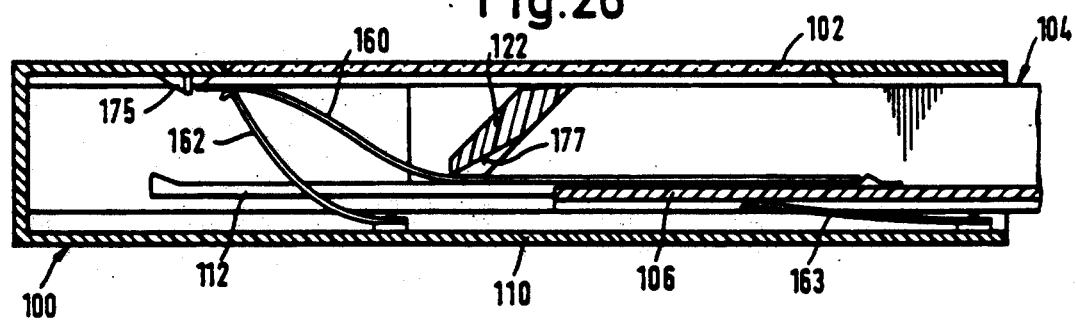
Figure 27:
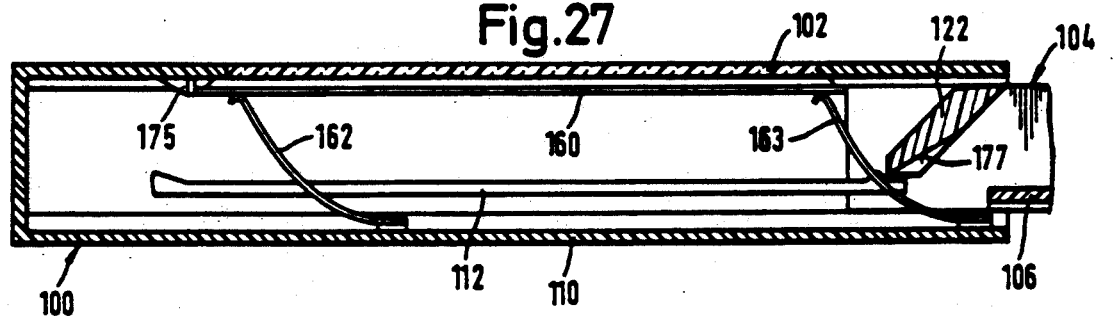
Figure 32:
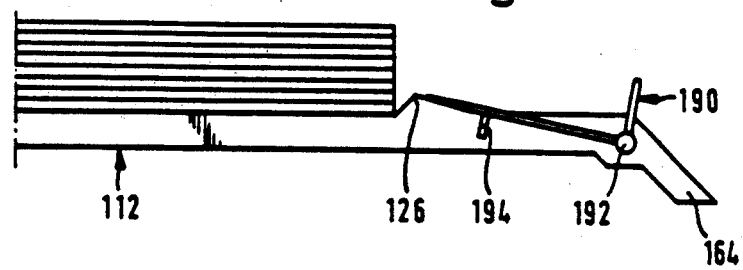
Figure 33:
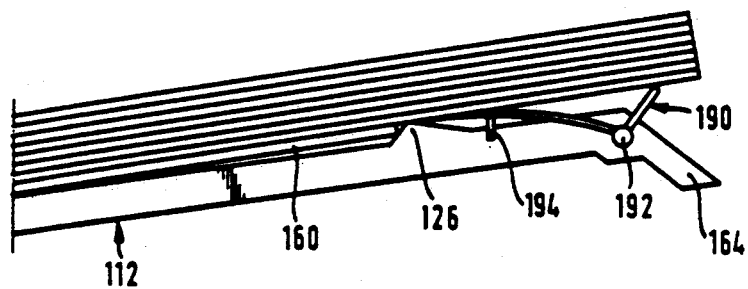
Figure 34:
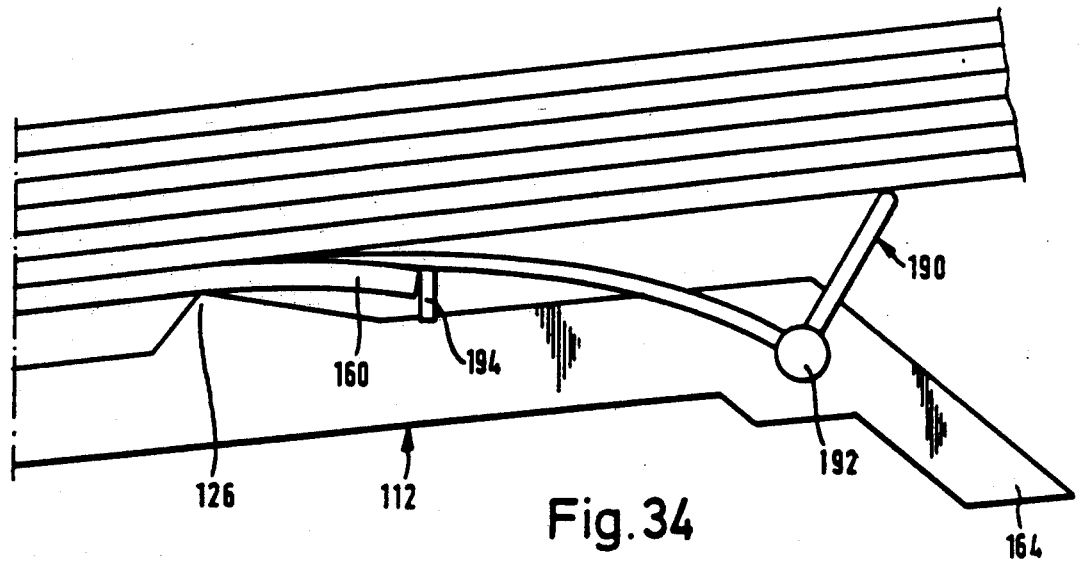
Figure 35:
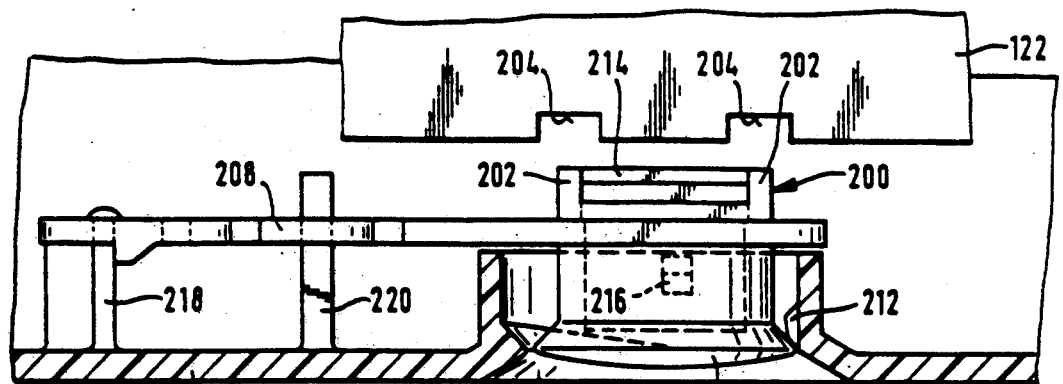
Figure 36:
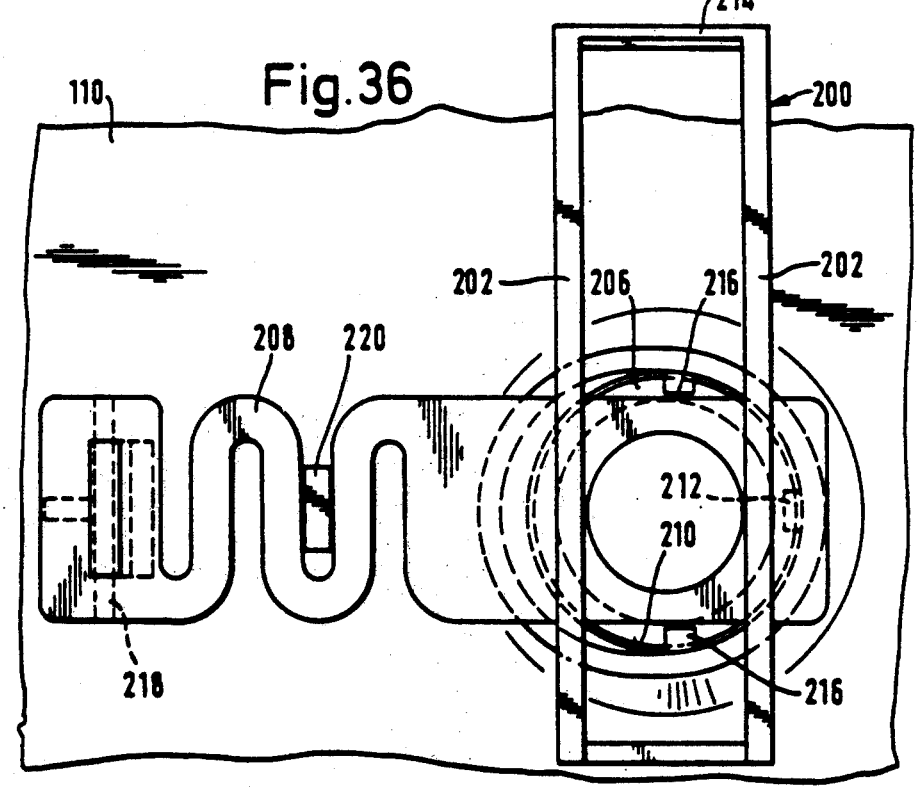
Figure 37:
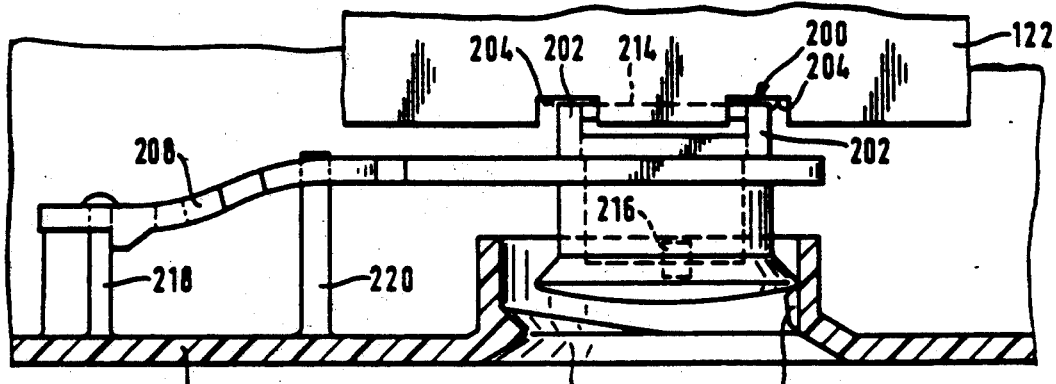
Figure 38:
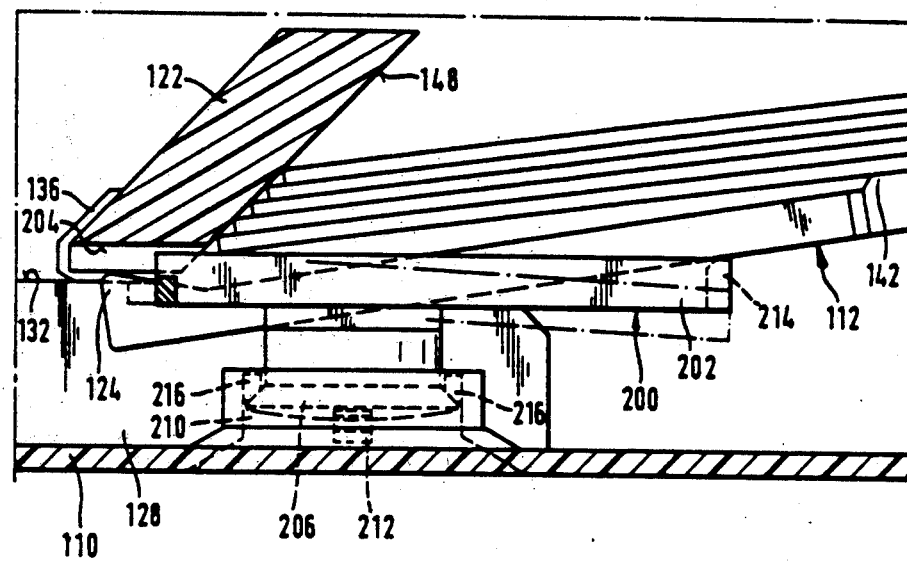
Figure 39:
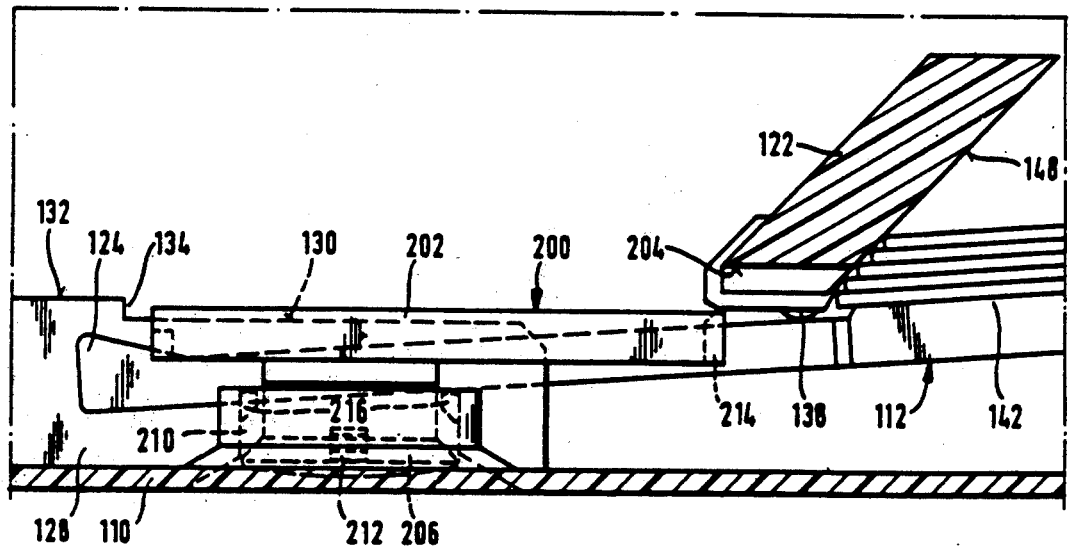

FIG. 1 shows in perspective view a sprung rail and components of the housing co-operating with it, FIG. 2 shows diagrammatically a cross-section in the region of the rail in co-operation with the separator shoe, FIG. 3 is a longitudinal section through the separator shoe, FIG. 3a shows the shoe in perspective, FIG. 4 is a section at right angles to the direction of movement of the slider member across the width of the slider member, FIG. 5 shows the conditions during insertion of the slider member, analogously to FIG. 2, FIG. 6 shows the positions of the parts level with the separator shoe on insertion, analogously to FIG. 5, FIG. 7 shows in a diagrammatic side view the position of the shoe and the rail with only a few sheets in the changer, FIG. 8 is a diagrammatic longitudinal section of the relative position of the parts when the slider member is inserted, FIG. 9 shows the start of the withdrawal, FIG. 10 shows a somewhat later phase, FIG. 11 shows in detail, in a diagrammatic longitudinal section, the initial phase of the rearranging process with the separator and rails co-operating, FIG. 12 shows a next phase in analogous view, FIG. 13 shows a later phase, FIG. 14 shows a subsequent phase, FIG. 15 shows the next phase, FIG. 16 shows, analogously to the preceding Figures, the relative position of the parts when the slider member is pulled out, FIG. 17 shows in detail the end position of the separator relative to the rails, FIGS. 18 to 20 correspond to FIGS. 8 and 16 and 15 respectively, in an alternative configuration of the rails, FIG. 21 shows the front end of a rail from FIGS. 18 to 20, FIG. 22 is a longitudinal section through the closed changer to illustrate the housing construction, FIG. 23 is a partial section at right angles to the section plane of FIG. 22 on an enlarged scale compared to the latter, FIGS. 24 to 29 show the behaviour of the auxiliary springs in different phases and modes of operation of the changer, FIGS. 30 and 31 show in two different phases the mode of operation of an alternative form of the retaining means for the individual sheet, FIGS. 32 to 34 show diagrammatically a further construction for retaining an individual sheet, FIGS. 35 to 37 show in partial section under two planes at right angles to one another the releasing device for removal of the entire pile, FIGS. 38 and 39 show in diagrammatic longitudinal section the mode of operation of this element, FIG. 40 shows a perspective view of a changer, and the operation of the changer in general will now be explained with reference to this Figure.

Figure 50:
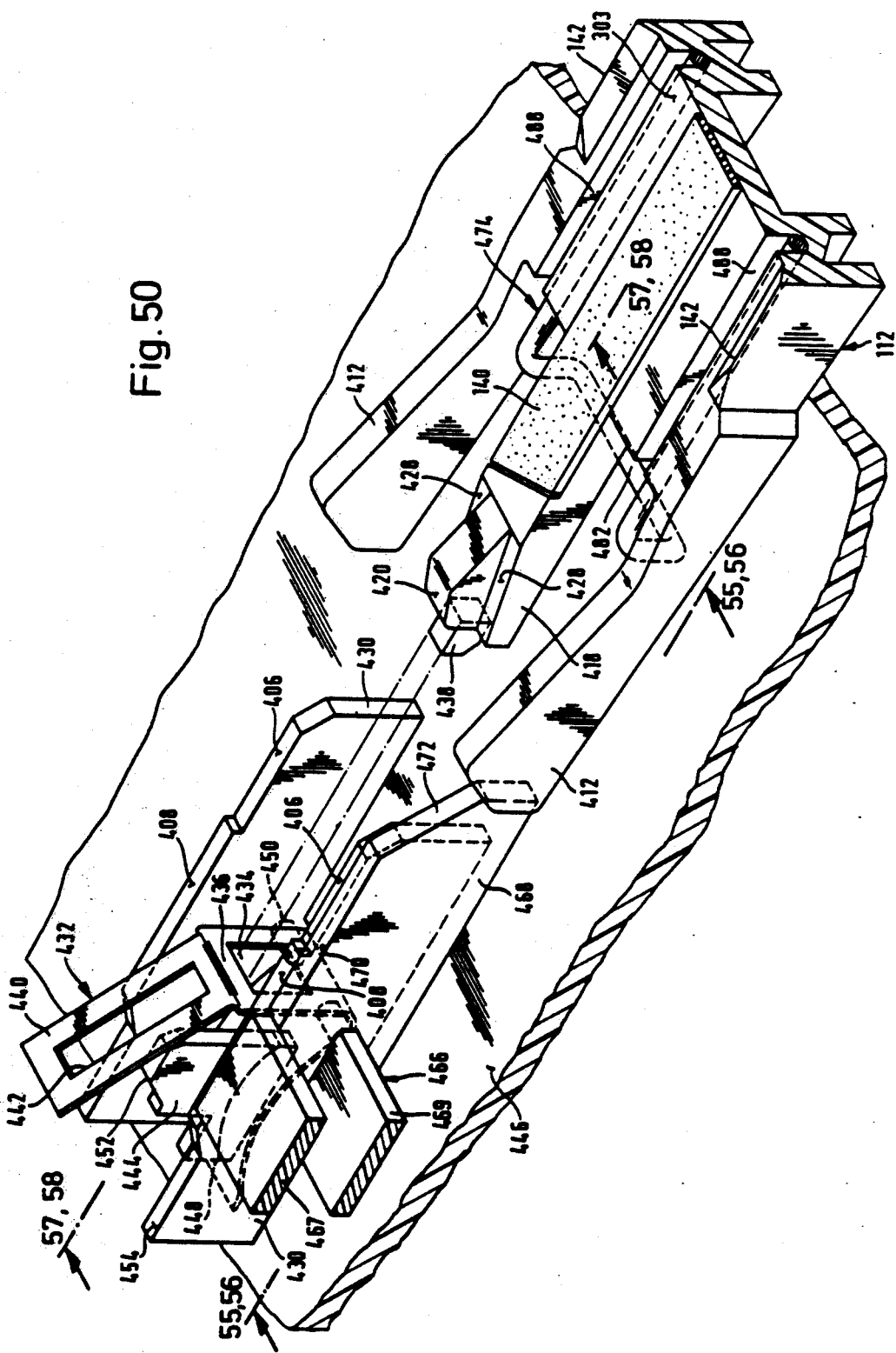
Figure 50A:
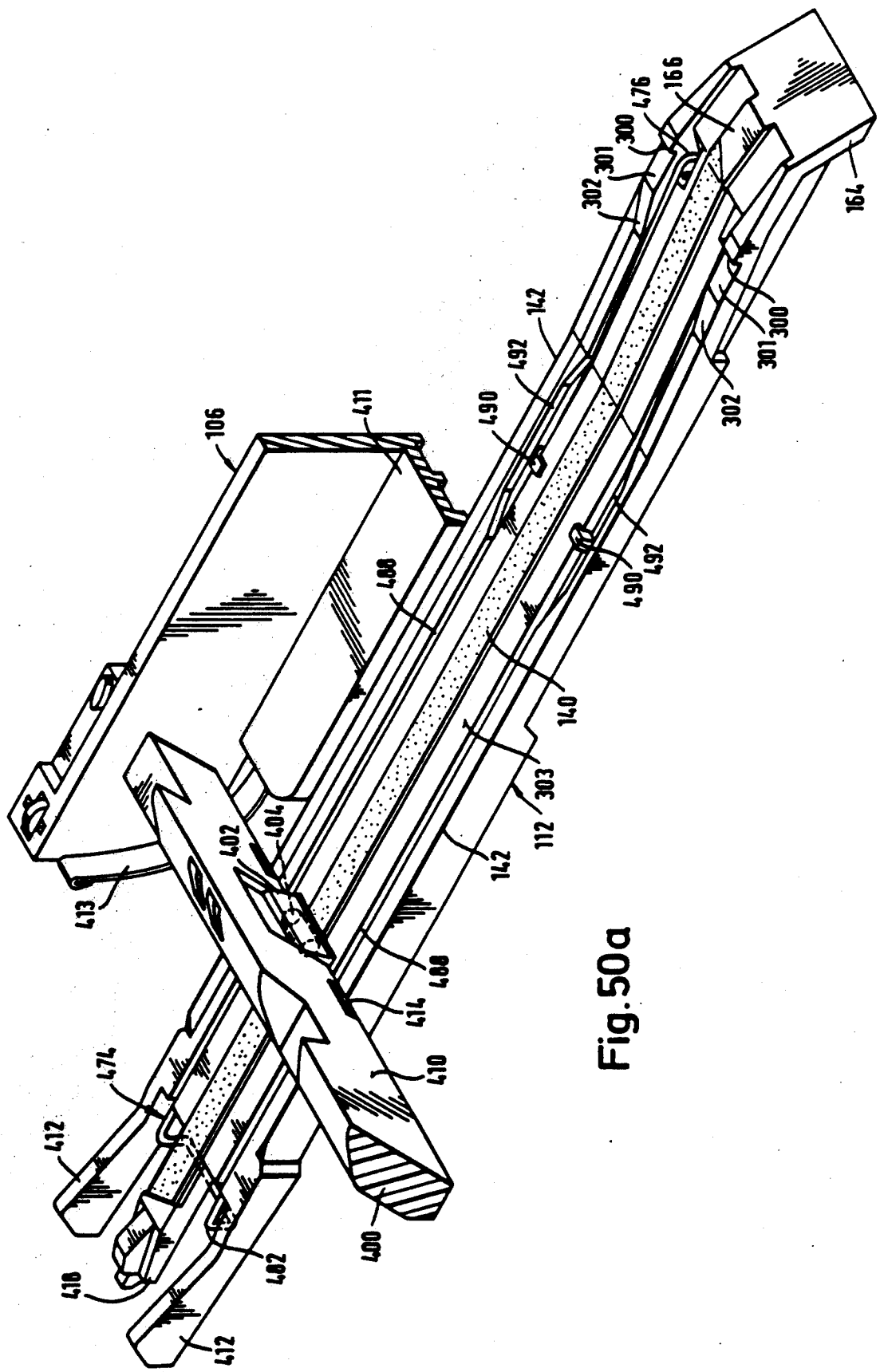
Figure 58:
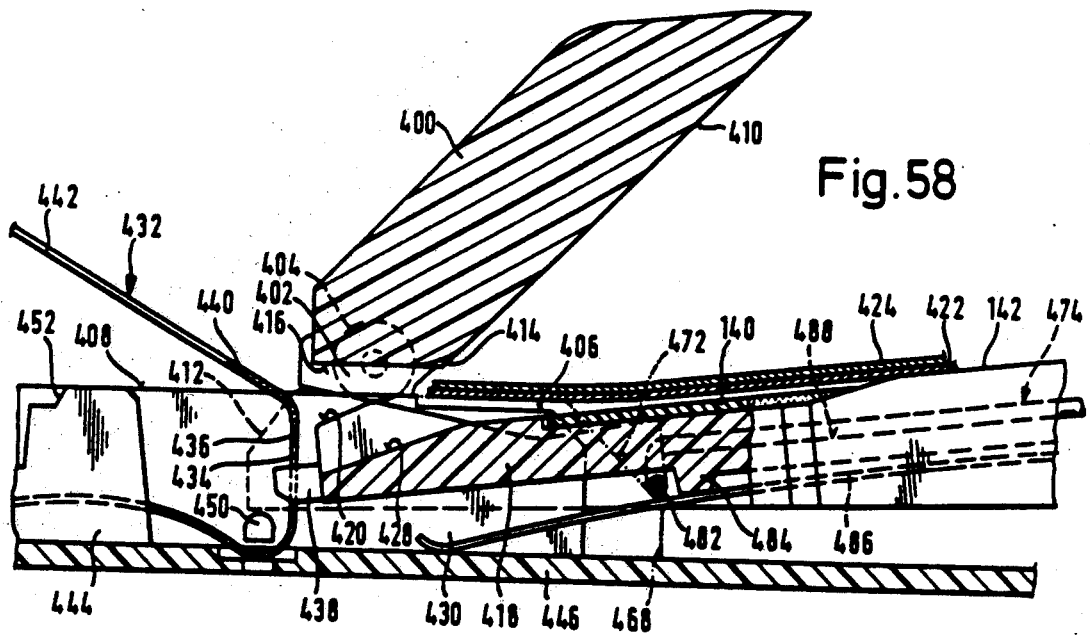
Figure 59:
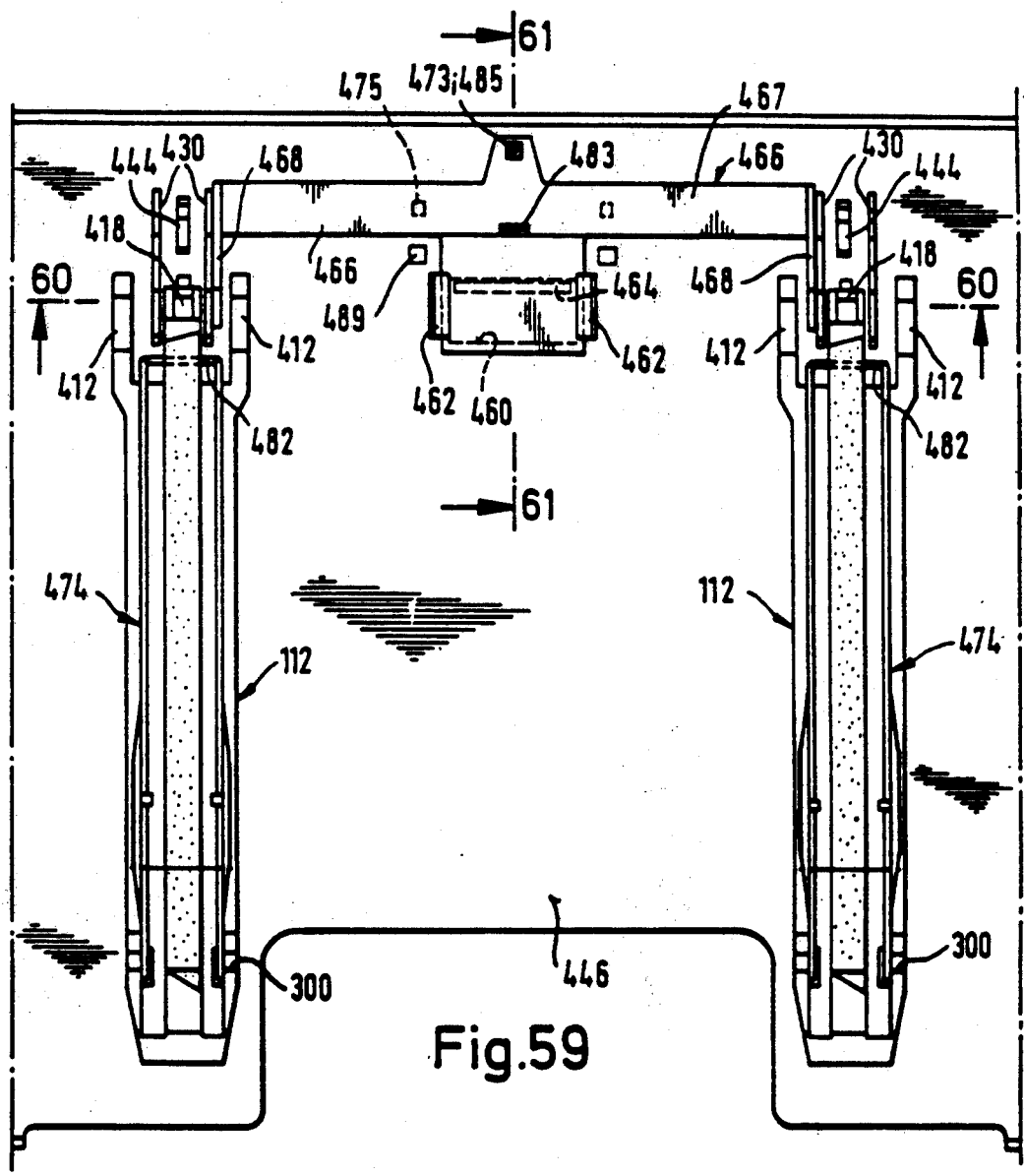
Figure 60:
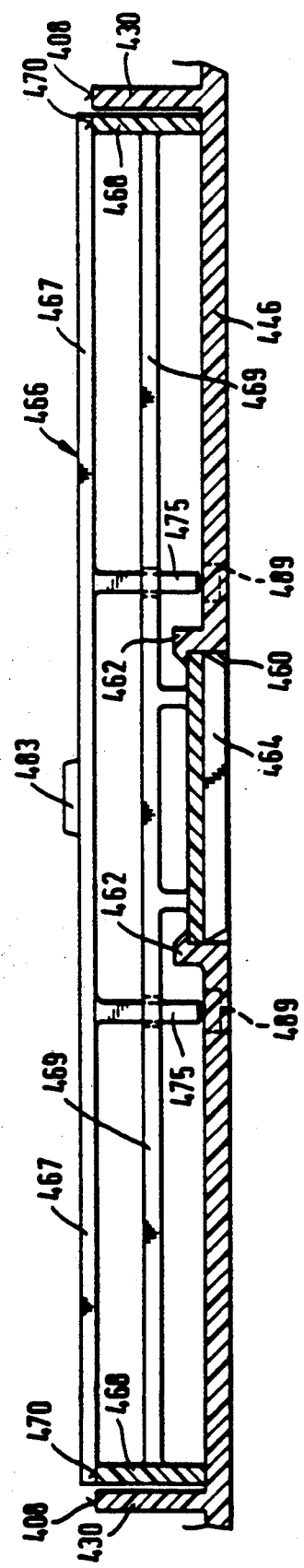
Figure 61A:
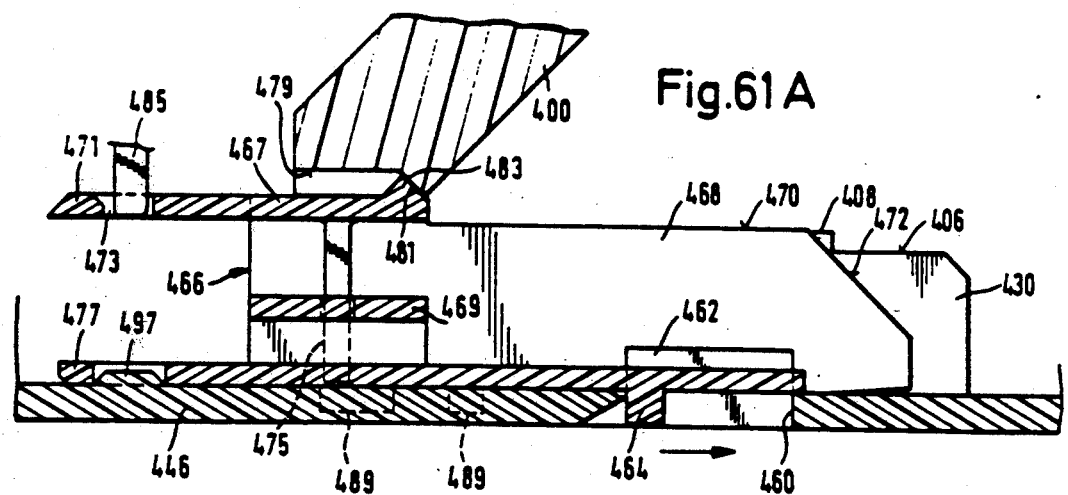
Figure 61B:
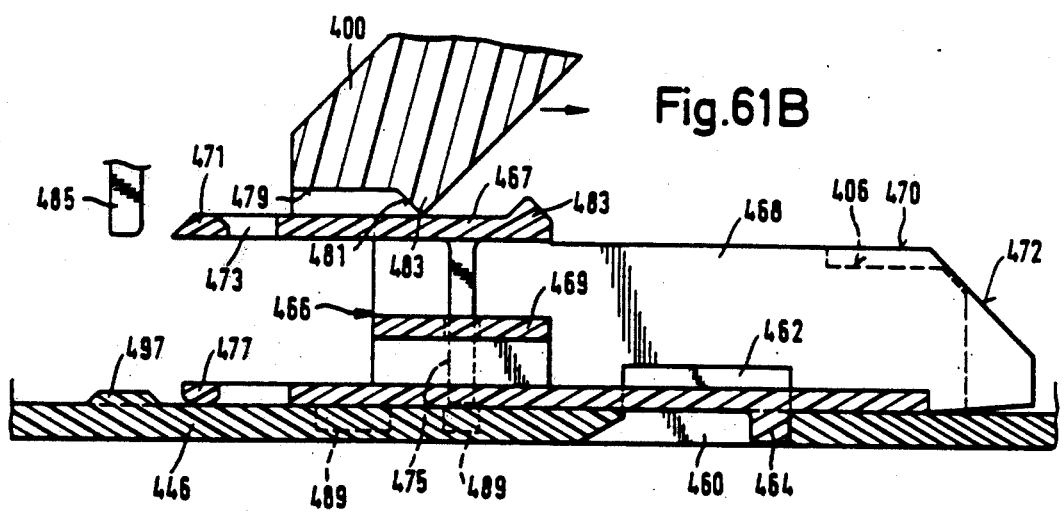
Figure 61C:
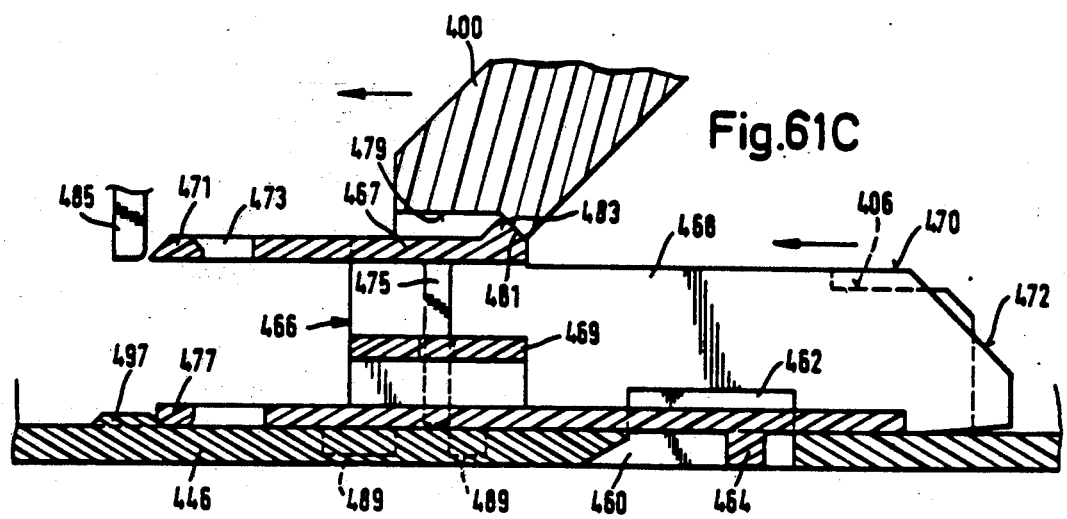
Figure 62:
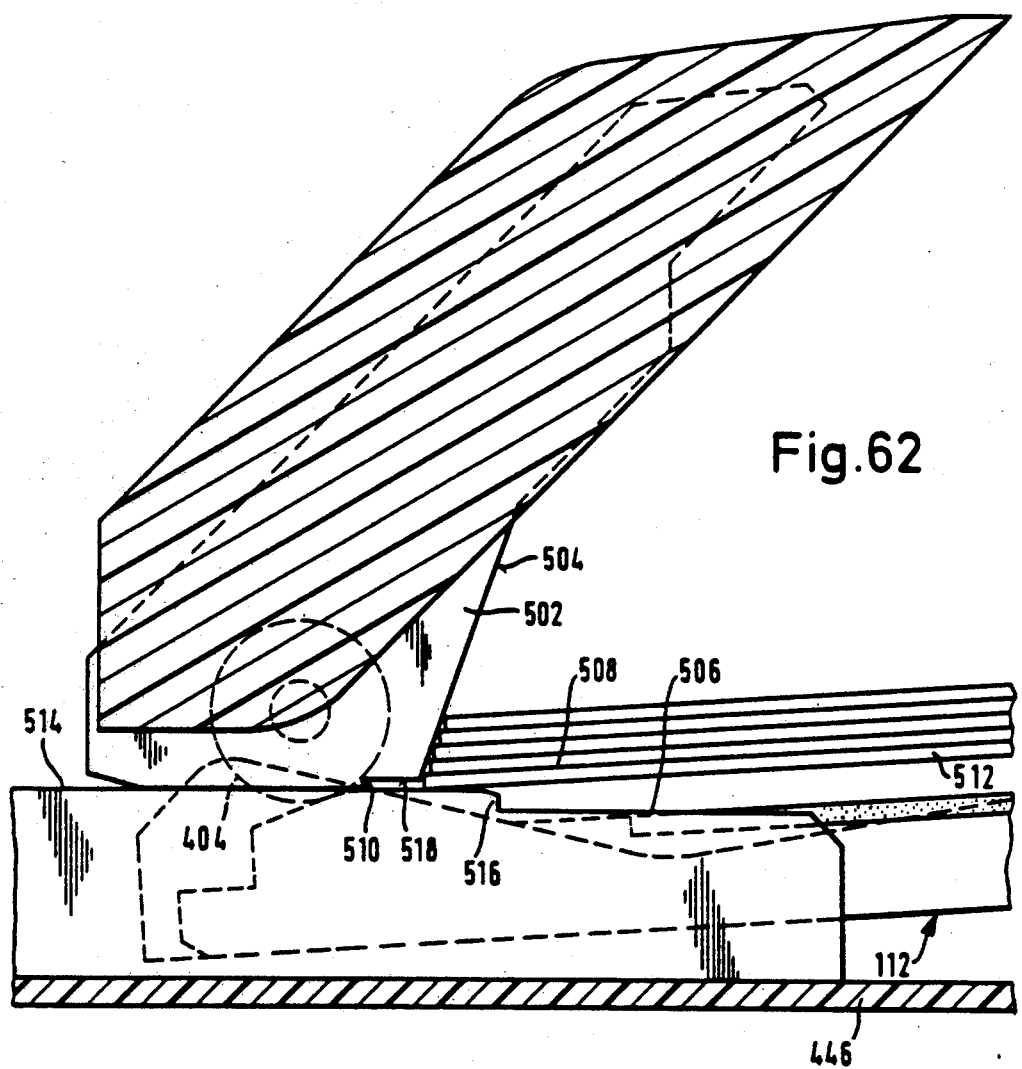
Figure 63:
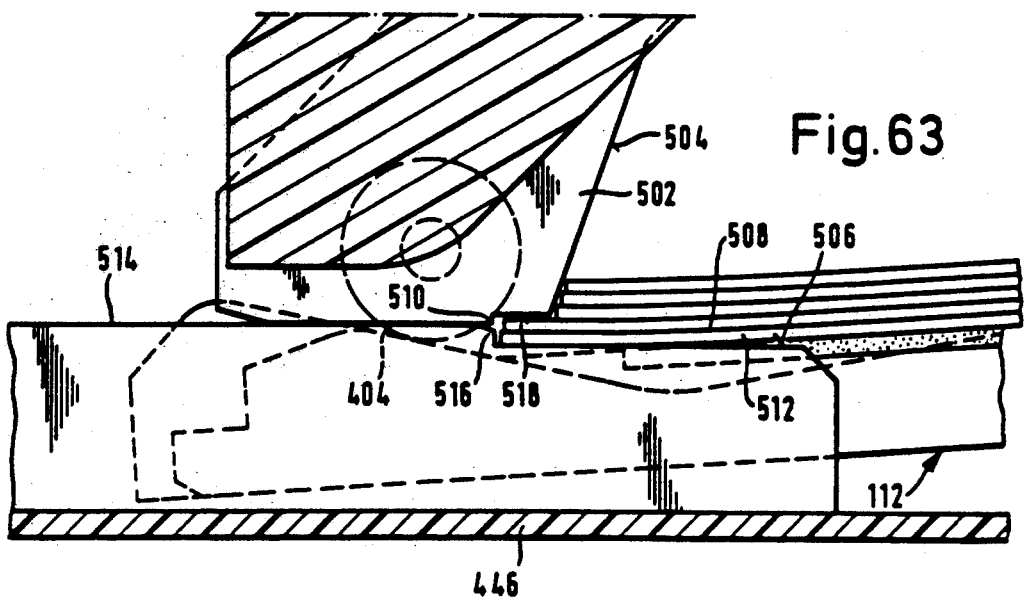
Figure 64:
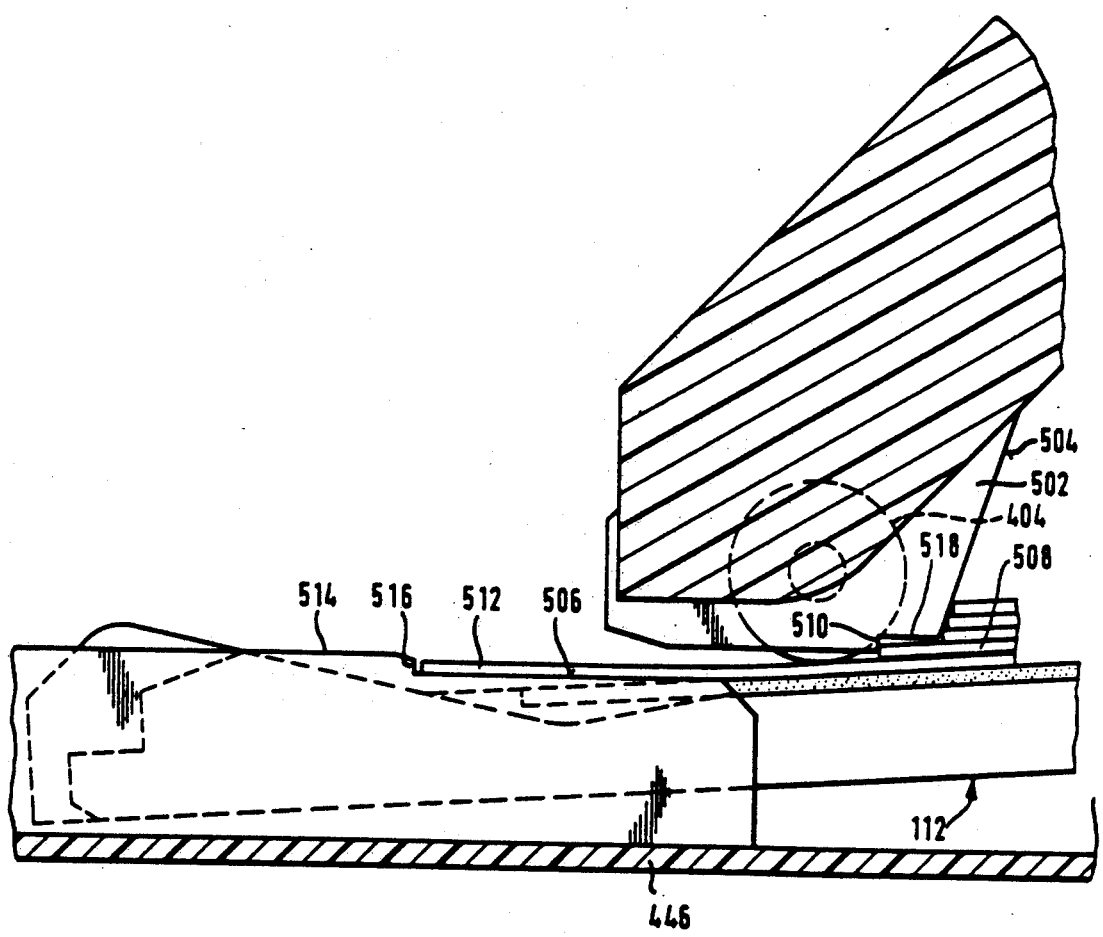
Figure 65:
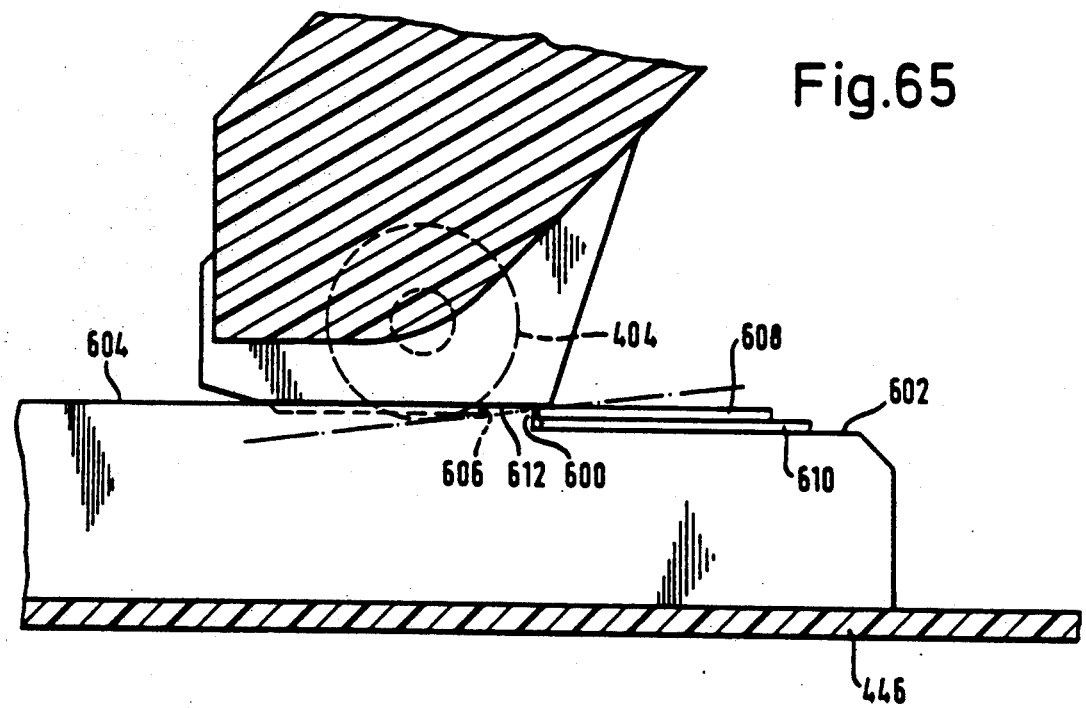
Figure 66:
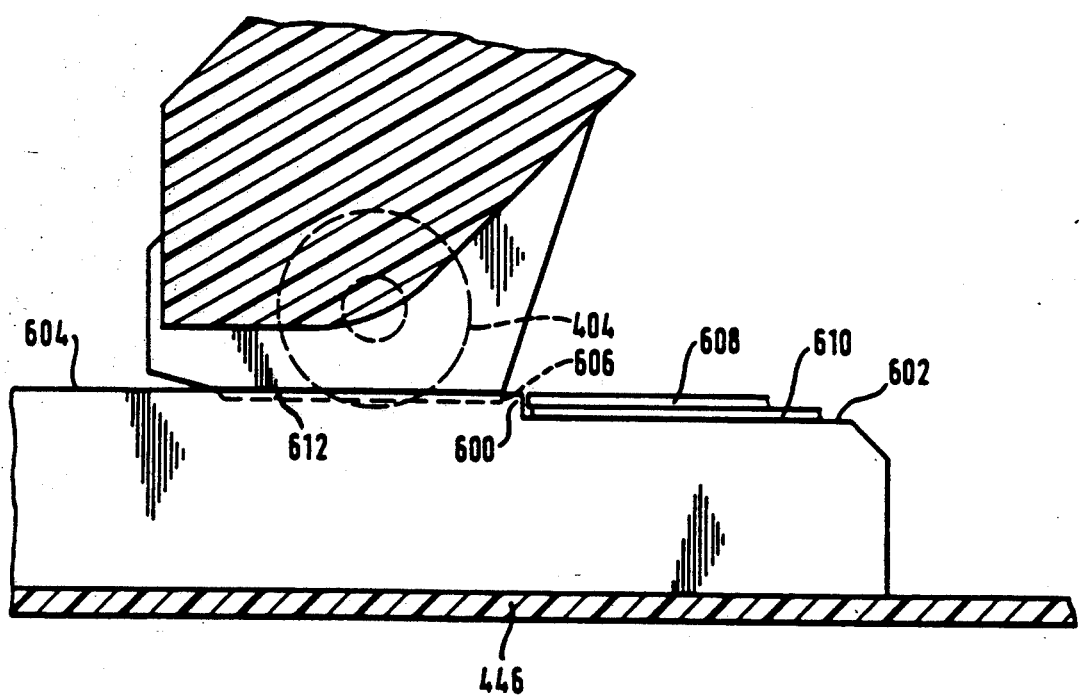

FIGS. 41a, b illustrate a problem that occurs with bowed sheets,

FIGS. 41c and 42 show a form of rail for eliminating this problem,

FIGS. 43 to 46 show four phases of the commencing changeover process at the other end of the rails of the modified form of embodiment, FIG. 47 shows in a perspective partial view the modified rail anchoring system, FIG. 48 shows in a diagrammatic vertical sectional view the position of the co-operating parts with the frame parts pushed together, FIG. 49 shows in an analogous view the situation with the frame parts pulled partly apart, FIG. 50 shows in partial perspective view the elements for disabling the change-over process, FIG. 50a shows the co-operation of rails, separator and slider member in partial perspective view, FIG. 51 shows in perspective view the bent wire part which is inserted into the rails shown in FIG. 50, FIG. 52 illustrates the assembly of the bent wire parts, FIG. 53 shows on a very enlarged scale the mode of operation of the disabling member, FIG. 54 shows in cross-section through the rails the position and mounting of the wire member, FIGS. 55 to 58 show four phases of the disabling of the system, FIG. 59 shows, in a plan view onto the bottom side of the housing, the arrangement of the disabling system, FIG. 60 is a section on a level with the line 60—60 from FIG. 59, FIGS. 61A to 61C show details of the disabling system in operation, FIG. 62 shows an enlarged view of another modified embodiment in partial vertical section, FIGS. 63 and 64 show the procedure at the start of withdrawal of the slider member, FIG. 65 shows analogously to FIG. 62 a further form of embodiment, and FIG. 66 shows yet a further alternative in an analogous illustration.

The changer shown in FIG. 40 is similar to a conventional picture frame for hanging up or standing up. It comprises a housing 100 which on its top side (where the terms "top" and "bottom" are used in the following description, they refer always to the position in relation to the housing, regardless of how this itself is arranged in the room) has a viewing window 102 in the form of a transparent pane 102. Parallel with the plane thereof, a slider member 104 can be withdrawn from and inserted into the housing, and on each complete backward and forward movement of the slider member a sheet change is effected in normal operation, that is to say, a pile of sheets, for example photographs, accommodated in the changer is cyclically rearranged in such a manner that, as the slider member is withdrawn, the lowermost sheet of the pile is held firmly in the housing, whilst the slider member carries the remainder of the pile with it out of the housing; as the slider member is reinserted, the picture is deposited on top of the remainder of the pile. Inside the housing there is an arrangement for exerting pressure on the pile which presses the pile upwards when the slider member is inserted and which is pressed downwards as the slider member is withdrawn. This is effected by means of a rear and inner transverse member of the slider member, which, because it separates the individual sheet from the remainder of the pile, is called a "separator"; the slider member comprises furthermore two parallel lateral bars 106 of L-shaped cross-section, and a front assembly 108; since the slider member is open underneath, the pressing arrangement secured in the housing is able to act on the sheets carried by the lateral bars of the slider member.

FIG. 1 shows the base plate 110 of the changer housing, the countersunk groove 111 serving to accommodate a stand, such that it can be let in flush and folded out, for positioning the changer in the manner of a stand-up frame. A pile of sheets (not shown) is pressed by a pressing arrangement towards the viewing window 102 provided in the housing for as long as the slider member 104 is inserted fully into the housing.

The pressing arrangement comprises two rails 112 parallel with one another and with the direction of movement of the slider member 104, each of the rails being fastened to an associated leaf spring 114. For this purpose the rail, which is injection-moulded from plastics material, has a rivet projection 116 which, on assembly, is pushed through a corresponding opening in the metal leaf spring and is expanded by deformation behind this. One end of the leaf spring 114 is placed on a locating peg 118 on the base 110 of the changer housing, while the other, free end of the leaf spring, although it is supported laterally by the walls of a groove 120 in the housing base, is able to move in the longitudinal direction of the rail (here and elsewhere, "longitudinally" means "in the direction of the slider member movement"; "transversely" means at right angles to the longitudinal direction). The leaf spring is formed into an upwardly arched bow, and the rail 112 is fastened approximately in the middle thereof. As the two rails and the associated springs and housing parts are of mirror-symmetrical construction relative to the centre line plane of the changer, only one half of the pressing arrangement needs to be explained in detail.

On withdrawal of the slider member 104, the separator 122 thereof runs onto the two outer prongs 124 at the inner end of the rail 112 ("inner" means "furthest away from the slider member front", "outer" means "close to the housing opening through which the slider member moves"), and presses it downwards against the force of the leaf spring 114. As this happens, the pile of sheets (FIG. 10) supported by the rails 124 also moves away from the viewing window 102 and the separator carries the pile outwards, with the exception of the lowermost sheet which is held firmly on the rails. The following steps are taken for this purpose:

Close to its outer end, the rail has integrally moulded upstanding projections 126 from which the lowermost sheets of the pile derive support, so that they are checked in relation to the separator movement. Close to the inner end of the rail, moulded integrally with the housing base 110 on either side of the prongs 124 there are upright, narrow rails 128, which have a support face 130 parallel with the housing base and parallel therewith a blocking face 132, the two faces being separated from one another by a step 134. As soon as the rails 112 have been pressed down by the separator, the inner edge of the lowermost sheet of the pile positions itself on the support faces 130. The step 134 has a height which is greater than the thickness of a single sheet but less than the thickness of two sheets, so that this edge of the lowermost sheet lies protected behind the step and the separator passes over it. The next lowest sheet on the other hand is carried by the separator and slides off the projections 126. On the side of the separator facing the rails there are mounted spring-loaded shoes 136 with small rollers 138, as will be explained hereinafter in detail. The small rollers have a width which is approximately the same as that of a retentive covering strip 140 arranged centrally on each rail.

The retentive covering is so called because it consists of a material which has a distinctly greater friction coefficient with the material of the sheets to be changed than this latter material has with itself (that is to say, the friction between the lowermost sheet and the retentive covering is much greater than the friction between the lowermost sheet and sheet immediately adjacent to it in the pile). The retentive covering may consist merely of a roughened area on the rail material, or alternatively of a special coating of an elastomer or a similar material. The force of the spring 114 acting from below presses the lowermost sheet with the retentive covering towards the associated small roller, so that the sheet is held firmly gripped.

The rail cross-section shown in FIG. 2 reveals the action of two lateral upright ribs 142: the top side of the retentive covering lies recessed with respect to the plane which is defined by the ribs and in which the individual sheet lies, and the small roller distorts the sheet, as shown (exaggeratedly) in FIG. 2. This is important for the return travel of the slider member, during which the individual sheet is located at the top close to the viewing window and the remainder of the pile is being transported inwards along the rails into the housing again: the small rollers of the separator then run in front onto the retentive coverings (FIG. 6), while the sheet that is then lowermost in the remainder of the pile is held by means of the ribs 142 away from the retentive coverings 140, so that these ensure the unchecked insertion of the remainder of the pile (FIG. 5).

FIG. 6 shows that the small roller 138 is narrower than the shoe 136 which in its turn, when the slider member is fully inserted, is wide enough to position itself, between the prongs 124 and on both sides of the central tongue 144 of the rail on which the retentive covering ends, on the blocking faces 132, and to lie on these under spring force when the slider member is pulled. The shoe on the one hand and the support faces on the other hand thus define a through-slot for the individual sheet, and the slot height is determined by the step 134. Only when the relevant edge of the individual sheet projects into the through-slot does the small roller run gently onto the inclined run-on edge 146 at the free end of the tongue 144; more accurately, this tongue positions itself gently from below against the small roller because the rail end, as a result of the separator 122 on both sides of the shoe meeting the thickened ends 146' of the prongs 124, had pressed the rail down "too far".

As FIGS. 3 and 3a show, the shoe 136, together with the small roller, which preferably consists of metal, forms an assembly which is movably guided in the separator. Between a transverse member 137 of the shoe and a support 139 integrally moulded with the separator there is inserted a helical compression spring 131. On each side of the spring the separator has projections 133 with a right-angled bend which engage beneath a top face 129 of the shoe and by means of a snapped-in lug prevent the shoe from falling out; the shoe, however, can be displaced against the spring bias for a limited distance in a direction approximately parallel to the inclined run-on face 148 of the separator. The small roller 138 is installed from below into the bearing blocks 143 of the shoe and is safeguarded against falling out in a manner not illustrated. These safeguarding means are not necessary for operation, but simplify assembly. The edge 145 of the shoe running in front of the small roller as the slider member is withdrawn is set back with respect to the small roller to such an extent that it is not able to touch the individual sheet even when there are only a few sheets in the changer and the rails are therefore inclined steeply towards the plane of the viewing window (FIG. 7).

FIGS. 8 to 10 show in a diagrammatic side view the steps in the initial phase of the sheet change-over, while FIGS. 11 to 15 show parts of this in detail.

Stationary phase: FIG. 8.

The shoes 136 are not yet resting on the blocking faces 132, but are supported by means of stops on the separator, since the blocking faces 132 at their end remote from the steps 134 likewise have a step 150. This is angled so that the shoe is able to slide on, in the same way as the step 134 and the support face 130 have run-on slopes which co-operate with a corresponding slope 152 of the shoe. The dimensions are such that when the slider member is fully inserted the shoe comes to rest exactly behind the slope of the step 150, so that the changer is not able to open on its own but requires a certain, even if only slight, pulling force to be exerted on the slider member.

The top edge 154 of the separator lies immediately in front of the thickened portions of the prongs 124, but the rails are still able to move freely under the action of the springs 114 towards the window or press an inserted pile against this.

Preparatory phase: FIGS. 9 and 11.

The slider member is withdrawn by a few millimeters. The inclined face 148 of the separator 122 has run onto the prongs 124 and has pushed these downwards a little way. The leaf spring 114 is extended somewhat by this and since it is fixed at its outer end to the housing base, its inner end travels counter to the withdrawal direction of the slider member, and the rails too are displaced relative to their starting position.

Separating phase: FIG. 12.

The edge of the shoe 136 running in front of the small roller passes over the end transverse edge of the lowermost sheet of the pile facing towards it.

Start of the retaining phase: FIG. 13.

The shoes have passed over the support face, and the small rollers 138 have positioned themselves on the inclined face 146; the separator pushes away the remainder of the pile in front of it. As clearly shown in FIG. 10, the leaf springs 114 have been even further extended, and the rails have been displaced still further in an inward direction.

Retaining phase: FIGS. 14 and 15.

The separator approaches even closer to the connection point between rail and leaf spring. The leaf spring is almost fully extended and the inclined face 146 of the inner middle tongue of the rail projects beneath hooks 156 which are integrally moulded internally on the rails 128. Without these hooks the inner end of the rails 112 would rise again under the action of the leaf springs 114 as soon as the separator has been moved out beyond a pivot point close to the rail centre; but the rails remain depressed until the slider member has reached its outer end position and also during the inward path of the slider member until the other side of the pivot point of its stroke.

The situation shortly before the outer end position of the slider member is illustrated in FIGS. 16 and 17. The Figures show that the small rollers 138 have already passed over the outer transverse edge of the individual sheet 160 so that this is no longer held gripped but lies beneath the inner end of the shoe 136. Close to their outer end, the rails 112 have a downwardly angled projection 164 which reaches close to the housing base 110, but does not touch this (as otherwise the rail would jam between the separator and the base). This projection prevents the leading edge of a sheet from getting beneath the rails as the device is filled with sheets.

Shortly before the outer end of the rails 112, their retentive covering 140 also terminates. The end of the retentive covering is cut off at an angle and in front of this the rail has a raised portion 166 terminating in a corresponding angle, the height of the raised portion not being constant, however, but decreasing from one longitudinal side to the other. In this manner it is possible to ensure that the small roller rolls on and off the retentive covering without being checked by this, although it has noticeable thickness tolerances.

FIGS. 18 to 21 show an alternative configuration of the rails. Instead of the integrally and rigidly mouldedon projections 164, in this case a movable projection 170 is connected by way of a so-called film hinge 172 to the rail body and is guided by means of a straight guideway 174 on the housing base. FIG. 20 shows the situation in which the slider member is but incompletely withdrawn, so that the resilient rails still project with their outer ends; if an attempt is now made to insert sheets, the projection reliably prevents sheets being able to get beneath the rails. In this case, the rail would be made from a suitable plastics material, with the film hinge being capable of withstanding continuous alternating stress, for example polypropylene.

FIGS. 22 and 23 reveal clearly the construction and arrangement of the auxiliary springs 162 and 163. These are relatively weak leaf springs which are fastened at one end to the housing base, namely beneath the slider member lateral bars 106 so that when the slider member is inserted they are depressed. If the slider member is pulled (FIGS. 24 to 27), the inner auxiliary spring 162 first of all lifts the inner end edge of the individual sheet in front of a stop 175, and when the slider member is fully pulled out the leading edge of the individual sheet is also lifted, so that it lies in front of the top side of the separator 122 and is able to pass through the gap between this and the top side of the housing when the slider member is pushed back.

As long as the changer is filled with sheets, as the slider member travel commences the separator runs onto the lowermost sheet and this presses the auxiliary springs lying laterally next to the rails with it beneath the separator. If the changer has not been filled, the auxiliary springs project freely upwards. So that in this case they can nevertheless be pressed down by the separator, this has corresponding recesses 177 with a wedge-like angled part which is sufficient to allow the free spring ends to slide down, as indicated in FIGS. 28 and 29.

FIGS. 30 and 31 show an alternative method of holding the individual sheet on the rails 112. On the underside of the rails there is integrally formed a slideway 180 in which a sheet metal gripper 182 is inserted such that it can be displaced to a limited extent in the direction of the slider member movement. In the starting phase (FIG. 30), the separator 122 runs first of all onto an upwardly directed spring hook 184 of the gripper and carries this for a limited distance with it, until the angled stop portion 186 meets the rear end of the rail. As this happens, the gripper is pushed with its spring hook end over the inner transverse edge of the sheet and holds this firmly. The spring hook yields resiliently outwards on further travel of the slider member. Close to the outer end position of the slider member, the separator passes over an outer spring hook of the gripper. As the slider member is pushed back, the separator presses the gripper into its starting position again in that it runs onto this outer spring hook 188 until the gripper strikes the front rail end. The sheet is now released and can be lifted by the auxiliary springs 162. On further insertion of the slider member the spring hook 188 yields inwards (shown by a broken line) and the same applies to the inner spring hook 184.

FIGS. 32 to 34 illustrate another alternative for retaining the individual sheet. Close to the outer end of the rail 112, a pivotable angled member 190 is mounted thereon such that it pivots about a pivot point 192. Starting from the stationary position (FIG. 32), first of all the individual sheet 160 is checked at the projections 126, while the remainder of the pile runs over the inwardly directed arm of the pivotable angled member, which arm tapers to an edge like a knife blade and, after the slider member has travelled a short distance, meets the upright second arm of the pivotable angled member. The pivotable angled member is deflected thereby but the blade-like arm is unable to lift the remainder of the pile, so that it is resiliently deformed. The individual sheet is now also pushed over the projections 126 (FIG. 34) until its outer transverse edge meets the stop projection 194 of the pivotable angled member. The tapered extension arm is thereby held pressed over the transverse edge for as long as the remainder of the pile is being moved. When the separator also has passed over the projection 194, the pivotable angled arm is able to spring up and release the individual sheet. During the return travel, the pivotable angled member is displaced back into its starting position again.

FIGS. 35 to 39 illustrate the means serving to disengage the change-over function, so that when the slider member is pulled the entire pile is transported by the slider member out of the housing. These means comprise a frame 200, the longitudinal struts 202 of which are displaced from below into recesses 204 on the underside of the separator 122 and in so doing lift the sheet edges lying in front of the separator to such an extent (FIG. 38) that the lowermost sheet is unable to get into the through-slot beneath the shoe 136; this sheet also is therefore carried along by the slider member (FIG. 39). The frame rests on a button 206, which in turn is fixed by way of a plastics spring 208 on the housing base 110 and can be displaced manually through an aperture 210 in the housing base.

The rest position of the button, in which the change-over function is "switched on", is illustrated in FIG. 35. If the button is pressed, then under the compression of the spring 208 it snaps over the locking edge 212 of the housing aperture 210 into the position shown in FIG. 37, in which the frame 200 blocks the change-over. If, as the slider member is withdrawn, the separator now runs onto the transverse strut 214 of the of the frame 200, this and with it the button 206, is tilted, so that the button is able to snap back into its initial position again, the tilting motion being effected about a stop 216. The spring 208 is secured to a base 218, which protrudes from the housing base 110, and is guided against a rib 220 so that the frame assumes the position parallel to the housing base shown in FIG. 37 even when the button is depressed.

FIGS. 41a, b, c and 42 show the end of a rail of an alternative embodiment. It is desirable to retain the individual sheet in the housing with a maximal force and the best engagement is provided by a "hook" lying adjacent the sheet edge, which hook extends approximately at right angles to the sheet plane. The hook, however, must not exceed a height equal to the thickness of one sheet, in the case of photographic prints for example about 0.25 mm, so that the second lowermost sheet and all the following ones are able to pass over it. As long as all sheets are perfectly plane, such a system would function. But this is not always the case, however, because, for example, photographic prints bow depending on the atmospheric humidity, for example about a transverse axis; in this case such a short hook is unable to grip the lowermost sheet (FIG. 41a). The pressure exerted by the springs 306 on the rail is not sufficient to flatten the sheets lying thereupon and thus bring the hook into engagement with the lowermost sheet. For this reason a rail profile according to FIG. 41b is preferred. FIG. 41c shows the rail end on an enlarged scale, and FIG. 42 illustrates a functional detail. The twin hook 300 extends upwards at right angles from a short plateau 301. It forms the end of a sloping ramp 302 which starts from the plane upper side 303 of the rail. The supported concavely bowed sheet follows the ramp and is engaged by the hook. If by chance the sheet to be separated is somewhat shorter than the sheet immediately following it, it is carried by the separator shoe in the direction towards the hook and throws off the sheet lying above it even when this is convex (FIG. 42); as it does so its leading edge slides along the plateau 301. This plateau also prevents the leading edge of the second lowermost sheet from being temporarily engaged and damaged by the hook if the rail assumes an extremely oblique position owing to the fact that there are only a few sheets in the changer.

The retentive coating 140 also has a sloping ramp 305 parallel to the ramp 302 so that the sheet to be separated is not too badly deformed by the small roller between the two ramps 302.

FIGS. 43 to 46 show the other end of one of the rails shown in FIGS. 41, 42 co-operating with the separator 400, the shoe 402 thereof, the small roller 404 and the support 406 and the blocking face 408. As in the first embodiment, the rail has a three-pronged end, but the contour of the prongs is of somewhat different design.

Figure 43:
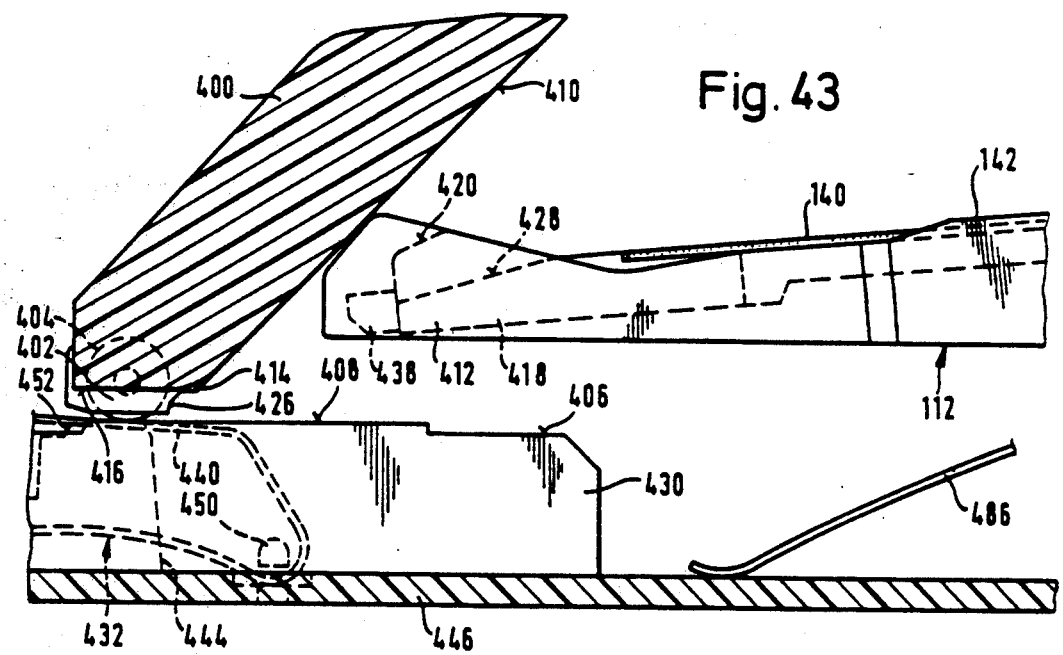
Figure 44:
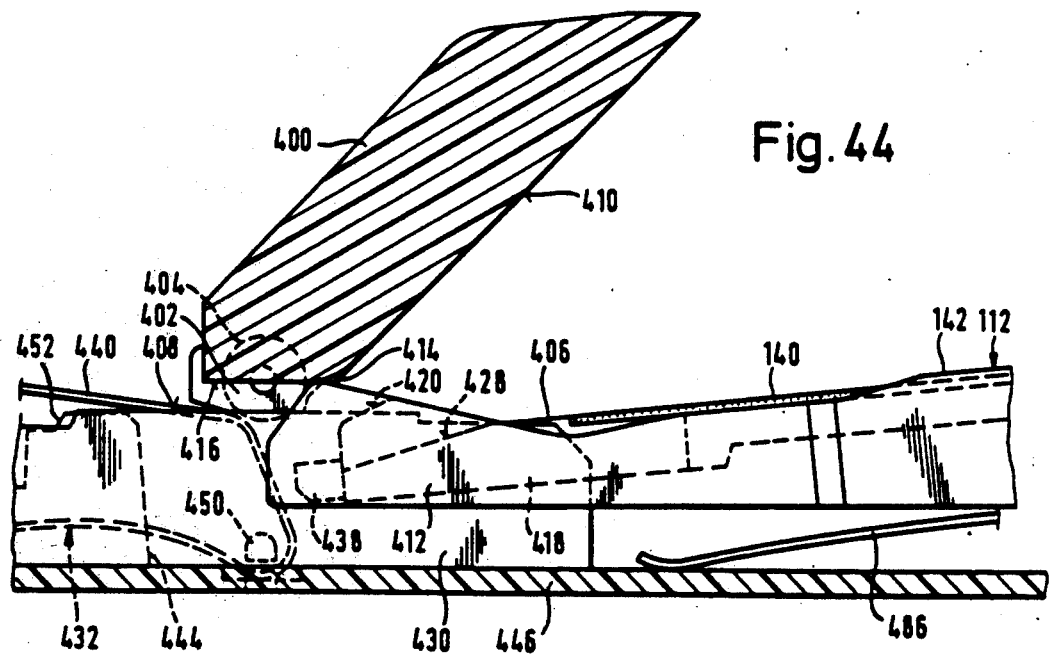
Figure 45:
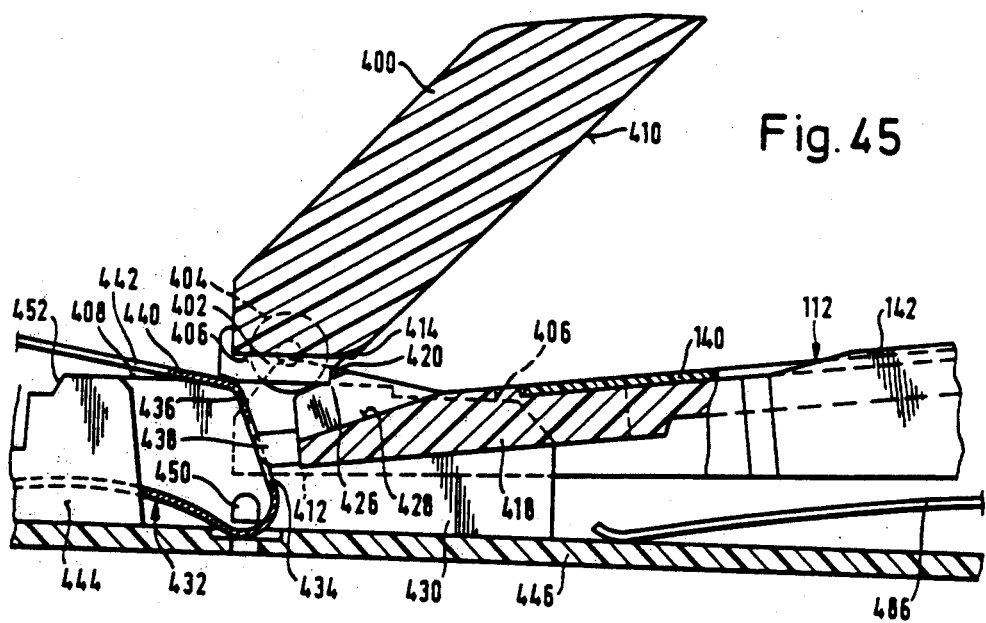

FIG. 43 shows how, after the start of the slider member withdrawal, the inclined face 410 of the separator has run onto the thickened prongs 412 of the rail. Between FIGS. 43 and 46 the inclined position of the rail varies between, for example, 5° and, for example, 7°. FIG. 44 shows how the separator follows with a rounded-off portion 414 the upper curvature of the prongs 412. After the portion 414 has passed over the prongs, the upper curvature of the prongs 412 lies against the plane face 416 of the separator, which face now rides on the outer prongs of the rail. In so doing, the shoe 402 approaches with its small roller 404 the middle prong 418 of the rail, so that the small roller is able to run on the rounded control face 420 thereof. On further travel of the slider member, the rail is finally pressed down into its lowermost position, shown in FIG. 46.

Figure 46:
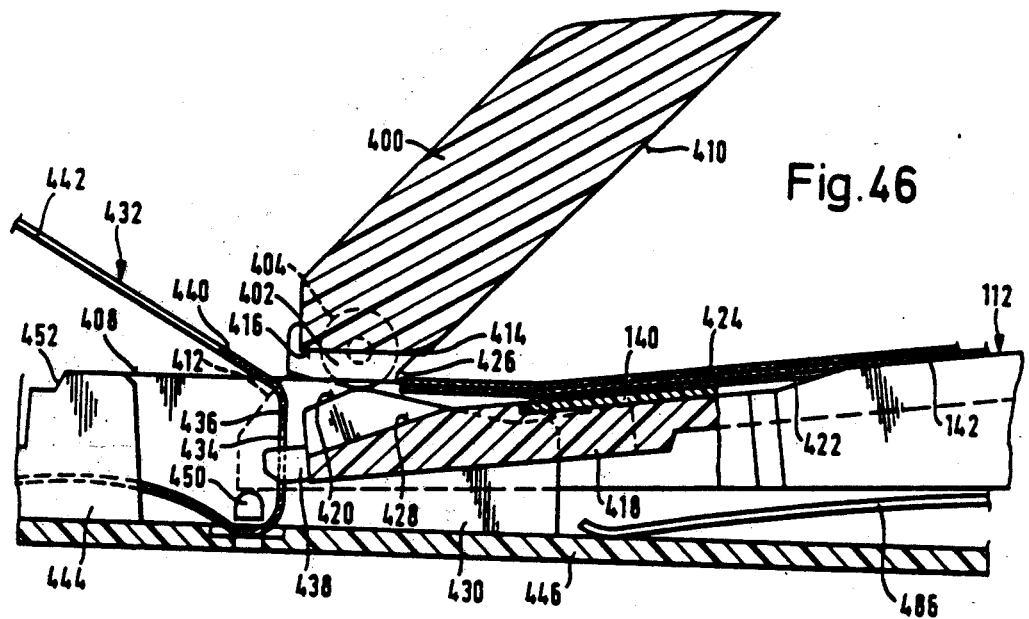

FIG. 46, two sheets 422, 424 are illustrated. The sheet 422 is intended to remain in the housing, while the sheet 424 is to be transported by the separator, or the shoe 402 thereof. It will be seen that the shoe has a transporter edge 426 which extends at a steeper angle than the inclined face 410. The sheet 422 is positioned on the support 406 and cannot be engaged by the transporter edge since it is held by the sheet 424 behind the step that separates the support face 406 from the blocking face 408. It is essential that the rail "dips" sufficiently far so that the sheet edges are not prevented from being positioned on the support 406.

The perspective illustration of FIG. 47 clearly illustrates the shape of the prongs. On both sides of the control face 420 there is a free space 428 for safety reasons. Although the small roller 404 has an axial dimension that is the same as the width of the central prong 418, the slider member necessarily has some free play in the housing, since without those free spaces the shoe 402 could strike with its edge 426 against the control face before the small roller presses the rail away; this can be seen clearly in FIG. 45.

It was explained above that this end of the rail is anchored, such that is performs a rocking movement, beneath immovably integrally moulded hooks when the slider member has passed over the pivot point of the leaf spring/rail system. Such a construction, however, is very demanding as regards the accuracy of manufacture and assembly because, when the sheet changer is completely filled, the remaining rail travel between the freely movable rail, when the slider member is inserted, and the anchoring position, when the slider member is withdrawn, is only extremely small, for example a few tenths of a millimeter.

It is therefore preferred to design the hook so that it is not immovable but movable, so that, controlled by the slider member movement, it is able to assume a holding position on top of the rail, or a release position. It is desirable for the hook not to reach its engaging position until after the rail has been depressed so that the latter will engage the hook from beneath.

This is achieved by the construction illustrated in FIGS. 47, 48 and 49. It should be noted that in FIG. 47 the rail and the engagement system are drawn in an exploded view; the actual position of the parts is shown in FIGS. 48 and 49, respectively.

Between the ribs 430 having the support and the blocking faces, there is arranged a spring-biassed anchoring bracket 432. This is a punched and bent component of resilient sheet metal having a first window 434, the transverse member 436 of which pivots over the extension 438 of the rail as soon as the free control projection 440 has been released by the separator (or more accurately by the small roller thereof).

The control extension has a second window 442, so that when the slider member is inserted the extension does not rest on the central rib 444 which is integrally formed with the housing base 446. The central rib has two functions. Firstly, the anchoring bracket 432 is anchored by snap-fitting to the end edge 448; the retaining bracket is guided beneath a pin 450 which extends transversely to the direction of movement of the slider member. The second function of the central rib 444 consists in forming a guide ramp 452 for the small roller 404. When the slider member is inserted, both the small roller and the shoe should be subjected to only slight spring bias. During the change-over operation, however, the shoe, which is engaged by the separator via a spring, is pressed with fairly strong bias against the blocking face 408. For this reason the blocking face 408 is recessed at 454, so that the shoe does not engage it. At the start of the slider member movement, the small roller runs first of all onto the ramp 452 and lifts the shoe higher than the level of the blocking face 408, onto which the shoe is then lowered as soon as the small roller comes clear of the middle rib.

The user should be able to disable the change-over function so that the entire pile can be transported out of the housing by the slider member. accordingly, means are required which
 lift the end of the lowermost sheet of the pile away from the support so that it can be engaged by the shoe, and
 release the other end edge of the same sheet from the hooks 300.

These means are illustrated in FIGS. 48 to 61.

Figure 55:
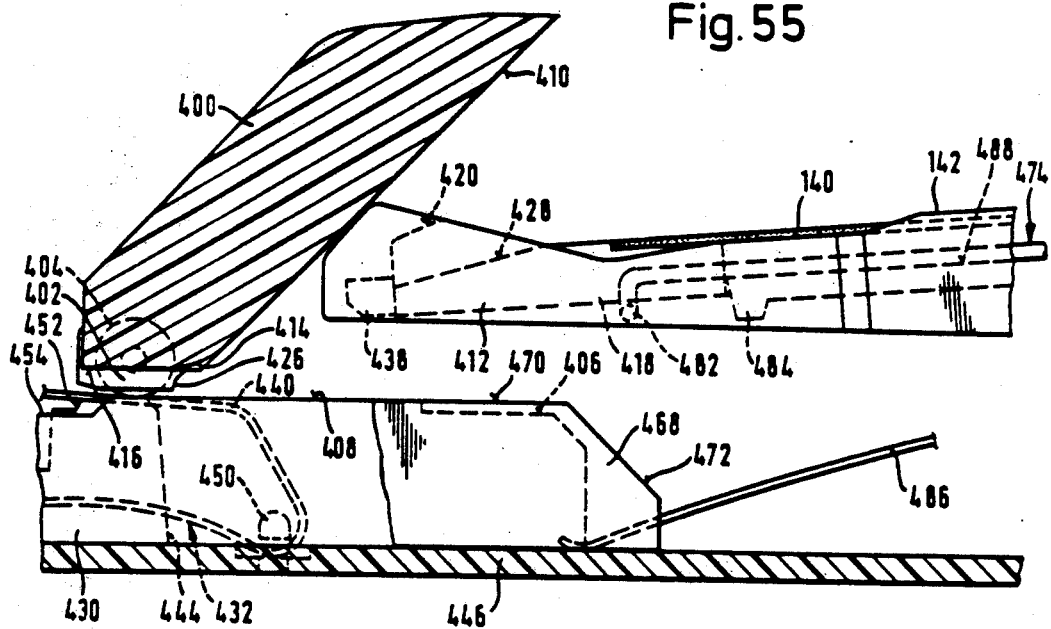
Figure 56:
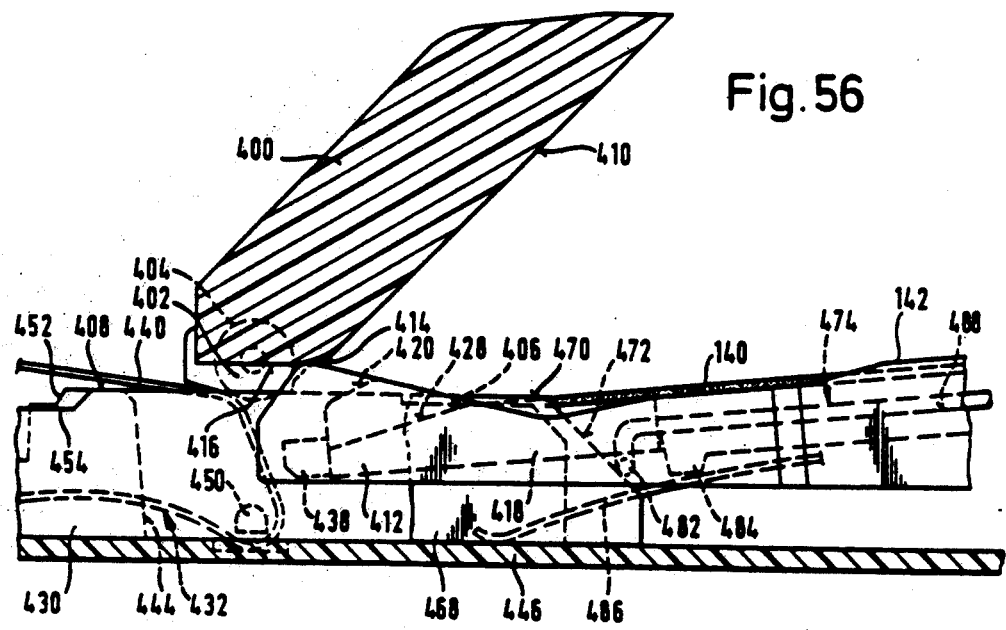
Figure 57:
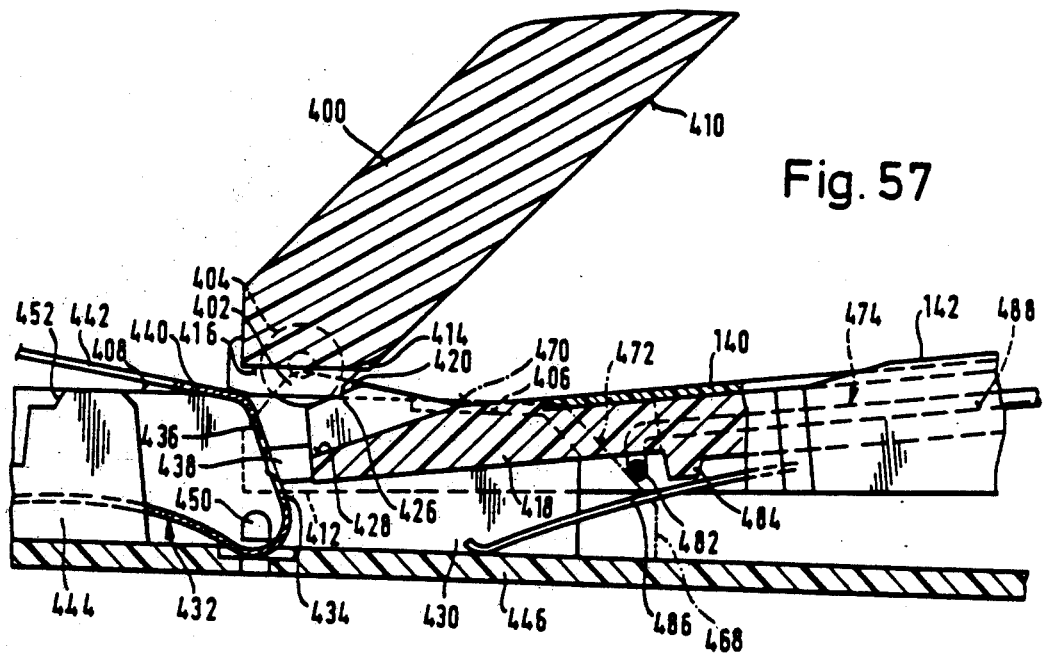

The housing base 446 has an aperture 460 with integrally moulded guiding rails 462, between which a key 464 is snap-fitted. The key is displaceable by a limited distance in the direction of the slider member movement, thereby carrying with it an integrally moulded transverse member 466 which in its turn displaces a pair of wedge-shaped ribs 468. These extend next to the inner ribs 430 and parallel therewith and, as shown in FIG. 55, each wedge-shaped rib 468 has a horizontal upper edge 470 on the same level as the blocking face 408. On displacement of the key 464 in the direction of the housing opening, the edge 470 assumes the position shown in FIG. 55, and it will be seen that the lowermost sheet cannot be positioned on the support 406 but has to be taken away by the shoe. The wedge-shaped ribs furthermore have a control edge 472 which here extends at an angle of, for example, 45°. Its function will be explained later.

FIG. 50a shows the co-operation of the separator, the shoes connected to it, the small roller located in these, and the rails. In particular, to the foot part 411 of the slider member side rail there is fastened a lifting spring 413 which lifts the separated individual sheet in front of a return slot during the return stroke of the separator.

The displacement of the other sheet end from its position in front of the hooks 300 necessitates a modification of the rails, the position of the rails not being predictable when the slider member is inserted because this position depends upon the number of sheets that are contained in the device. Provision is therefore made for such a modification of the rails to be effected when the rail, after the start of the slider member withdrawal, follows a path which is forced upon it by the separator regardless of the number of sheets.

Each rail carries a control member 474 which is bent from a single piece of wire. The two free ends of the wire member are provided with eyelets 476 that cooperate with a control ramp 478 of the rail. A displacement of the eyelets to the left in FIG. 53 results in a sheet, which would otherwise assume a position in front of the hooks 300, being guided over the latter, so that the hooks remain ineffective. At the same time, the spring is biassed (or an existing bias is increased) so that the eyelets 476 tend to return to their withdrawn position, illustrated in FIG. 53 by a solid line, and which is defined by the stop 480.

The other end 482 of the control member is guided and bent at right angles beneath the middle prong 418 of the rail. When the separator depresses the inner rail end, this transversely extending wire portion strikes against the control edge 472 of the wedge-shaped rib. The control member is therefore shifted ever further to the left with continuing depression of the rail end, with the eyelets being displaced correspondingly. FIG. 58 shows that this displacement has already been concluded before the transporter edge of the shoe meets the transverse edge of the lowermost sheet of the pile. A transverse rib 484 moulded integrally with the rail body spaces the leaf spring 486, by which the rail is carried, from the control member end 482, so that the latter cannot be clamped by the spring 486 and remains freely movable, even when the rail has been fully depressed.

The control member is mounted on the rail by a snap-fit method. The rail has two parallel grooves 488 in which the longitudinal portions of the member are freely displaceable. At one point over each of these grooves there extends a claw 490 around which the free ends of the control member are bent and behind which they assume their extended linear shape again. A widened portion 492 of the groove enables the wire to be deformed simply by pressing on it and to be mounted by means of a snap-fit there and then.

There are additionally provided means that prevent incorrect operation, that is to say, an actuation of the key 464 with the slider member partly withdrawn, and that ensure that the key and all components connected therewith are returned automatically to their initial position. These means are illustrated in FIGS. 60 to 61C, FIG. 60 being a cross-section level with the key 464 and FIGS. 61B and C being partial sections taken at right angles thereto.

The transverse member 466 comprises an upper bar 467, which is able to yield in the direction of the key 464, and a guiding bar 469 lying therebeneath which is connected to the key and, by way of the wedge-shaped ribs 468, to the upper bar. From the latter there extend inwards, that is, in the opposite direction to that of the wedge-shaped ribs, a central arm 471 with a hole 473, and also downwards two control pins 475. A reset tongue 477 with which is associated a reset projection 497 integrally moulded with the housing base extends backwards from the key 464.

FIG. 61A shows the initial position with the slider member pushed in. It will be seen that the separator has on its underside a recess 479 terminating in a control ramp 481; a cam projection 483 integrally moulded with the upper bar 467 projects into this recess. If, starting from this position, the key is displaced to the left in FIG. 61B to disable the change-over function, the cam projection 483 is pressed downwards by the control ramp 481, taking the central portion of the upper bar 467 downwards with it. The hole 473 of the locking arm 471 comes free of a locking pin 485 moulded rigidly on the housing, and the control pins 475 too are able to yield resiliently downwards into corresponding recesses in the housing base. The reset tongue yields resiliently as it passes over the reset projection. Even if the slider member is only partly withdrawn, the key remains latched. The separator is able to run over the actuated key to deform the upper bar again, since even in this position of the key there are recesses in the housing base lying opposite the control pins. (FIG. 61C). As the slider member is returned, it displaces the key initially for a short distance to where the control pins are locked so that the bar 467 is unable to yield resiliently; instead, the entire assembly of the key is returned to the initial position as a result of the reset tongue being deflected by the rest projection.

FIGS. 62 to 64 show a modified form of embodiment of the pile transporting elements particularly suitable for co-operation with the hook-like transporter 300 for the individual sheet. As these transporters engage virtually at right angles to the sheet plane, the separating force is maximal. However, this is only effective if the second sheet to be separated from the individual sheet is engaged and displaced with at least approximately the same maximal force. That is to say, the end face of the shoe engaging the second lowermost sheet should extend also at right angles to the sheet plane.

In the constructions described so far, this face is inclined for the reason that the pressure exerted on the pile edges by the separator is to be converted into a downwards movement of the rails carrying the sheets, so that the last (lowermost) sheet to be separated is reliably positioned on the support and in front of the blocking face.

In order to permit such an advantageous configuration of the transporter face of the shoe, the construction according to FIGS. 62 to 64 is selected.

The shoe 502 has an inclined face 504 along which, as in the previous forms of embodiment, the sheet edges are conveyed to the support 506. The second lowermost sheet 508 is provided with a separate transporter face 510 extending at right angles to the support plane, the height of which transporter face is clearly less than the thickness of one sheet so that at the start of the withdrawal movement the entire pile, including the sheet 512 to be separated, is transported along the blocking face 514. (FIG. 62).

As soon as the transporter face 510 passes over the step 516 which separates the blocking face from the support, the entire pile is displaced further downwards by the height of this step, the sheet 508 positioning the lowermost sheet 512 behind the step. The step 516 has a height exceeding the thickness of one sheet and less than the thickness of two sheets. The best compromise it to make the sum of the heights of the step 516 and the transporter face 510 equal to the thickness of two sheets. The bottom surface 518 of the shoe which extends parallel to the support ensures that the sheet 512 is positioned flat on the support and that the sheet 508 is reliably presented to the transporter face 510.

As shown in FIG. 64, the lower edges of the shoe lying one behind the other are offset in relation to the small roller such that the edge cannot ride on the sheet 508 despite a maximum inclined position of the rail (about 7°) and cannot lift the roller away from the sheet 512, which would impair the clamping function thereof.

A further modification of this principle is illustrated in FIG. 65. The step 600 between the blocking face 604 and support 602 has a height that is somewhat greater than the thickness of two sheets. The shoe again has its own transporter face 606 for the lowermost sheet 608, which rests not on the blocking face 604, but hangs down between the two ribs carrying the blocking faces, so that only the lowermost sheet 610 remains positioned on the support 602 while the sheet 608 is taken along. This construction has the advantage that all the sheet edges are pressed as far as the step 600 in the direction of the housing base and both lowermost sheets are reliably positioned behind the step 600. For this reason the transporter face is set back with respect to the end edge of the inclined face since the displacement of the sheets 608, 610 to behind the step 600 requires a certain stroke. The horizontal roofing 612 calibrates the aperture and holds sheet 610 reliably on the support.

Since both sheets 608, 610 are braked, not only is sheet 610 held firmly at its other end by means of a hook but also sheet 608 too, which, however, must be released again. For this reason only a braking hook and not an arresting hook is suitable, for example as shown in FIG. 1 at 126.

The construction shown in FIG. 66, in which the transporter face for the second lowermost sheet directly adjoins the inclined face, is less suitable, for the reasons discussed above, but may function if the changer is operated relatively slowly.

I claim:

1. A device for separating an individual sheet from a pile of sheets of substantially equal thickness, said individual sheet having a first side facing remaining sheets of said pile and a second side facing away from said remaining sheets, said device comprising:
   a positioning member for said to-be-separated individual sheet defining a support plane for said second side of said individual sheet,
   a transport member for displacing said sheets in a displacement direction along said positioning member, said transport member having faces engaging transverse edges of said sheets, said faces (1) being delimited by an end edge extending parallel to said support plane and (2) comprising a step portion adjacent said end edge, said step portion extending substantially orthogonally to said positioning member plane, said step portion being adapted to engage at least a particular sheet immediately adjacent said individual sheet and to displace said particular sheet relative to said individual sheet, and
   means for guiding said transverse edge of said individual sheet past said end edge of said transport member faces onto said positioning member.

2. A device according to claim 1 comprising a shield step in front of said positioning member, said shield step having a height exceeding said thickness.

3. A device according to claim 1 wherein said transport member faces include an inclined face forming an acute angle with said support plane and transmitting a force onto said sheets towards said positioning member.

4. A device according to claim 3 wherein said step portion is offset, with respect to an end of said inclined face adjacent to said step portion, by a given amount in a direction opposite the transport member displacement direction.

5. A device according to claim 4 wherein said transport member comprises an intermediate face that extends substantially parallel to said support plane between said inclined face and said step portion.

6. A device according to claim 1 wherein said end edge is spaced from said positioning member by more than said thickness and less than twice said thickness.

* * * * *